(12) United States Patent
Wadsworth

(10) Patent No.: US 9,757,934 B2
(45) Date of Patent: Sep. 12, 2017

(54) OVERLAY APPLICATOR AND METHOD OF USING THE SAME

(71) Applicant: Belkin International, Inc., Playa Vista, CA (US)

(72) Inventor: John F. Wadsworth, Burbank, CA (US)

(73) Assignee: BELKIN INTERNATIONAL INC., Playa Vista, CA (US)

( * ) Notice: Subject to any disclaimer, the term of this patent is extended or adjusted under 35 U.S.C. 154(b) by 73 days.

(21) Appl. No.: 14/455,700

(22) Filed: Aug. 8, 2014

(65) Prior Publication Data

US 2015/0041069 A1 Feb. 12, 2015

Related U.S. Application Data

(60) Provisional application No. 61/863,895, filed on Aug. 8, 2013, provisional application No. 61/871,864, filed
(Continued)

(51) Int. Cl.
*B32B 38/18* (2006.01)
*B32B 38/16* (2006.01)
(Continued)

(52) U.S. Cl.
CPC ...... *B32B 38/1833* (2013.01); *B29C 63/0004* (2013.01); *B29C 63/024* (2013.01);
(Continued)

(58) Field of Classification Search
CPC .............. B29C 63/024; B29C 63/0004; B29C 2063/0008; B29C 63/02; B29C 63/0047;
(Continued)

(56) References Cited

U.S. PATENT DOCUMENTS

D305,648 S 1/1990 Edington
4,895,231 A 1/1990 Yamaguchi et al.
(Continued)

FOREIGN PATENT DOCUMENTS

CN 201456516 5/2010
CN 102632674 8/2012
(Continued)

OTHER PUBLICATIONS

International Search Report and Written Opinion for PCT/US2014/050420, dated Nov. 19, 2014.
International Search Report and Written Opinion for PCT/US2014/071767, dated Apr. 24, 2015.
International Search Report and Written Opinion for PCT/US2014/060300 dated Jan. 27, 2015.
AMZER—Kristal Screen Protectors—http://www.amzer.com/kristal/, Mar. 21, 2014.
(Continued)

*Primary Examiner* — Patricia L Nordmeyer
(74) *Attorney, Agent, or Firm* — Kilpatrick Townsend & Stockton LLP

(57) ABSTRACT

An overlay applicator can include an overlay with a top side and a bottom side. The bottom side can include an adhesive agent configured to adhere to a screen of an electronic device. The overlay applicator can include an adhesive release liner. The adhesive release liner can include a top side and a bottom side. The top side of the adhesive release liner can be removably attached to the bottom side of the overlay. The adhesive release liner can be configured to protect the adhesive agent at the bottom side of the overlay from contaminants. The overlay applicator can include a protective film removably attached to the top side of the overlay. The overlay applicator can include an alignment tab. The alignment tab can include an alignment mechanism. The overlay applicator further can include a pull tab. The pull can include a wiper. Other embodiments are provided.

24 Claims, 21 Drawing Sheets

Related U.S. Application Data on Aug. 29, 2013, provisional application No. 61/890,271, filed on Oct. 13, 2013.

(51) Int. Cl.

| | | |
|---|---|---|
| *B32B 37/18* | (2006.01) | |
| *B32B 37/00* | (2006.01) | |
| *B32B 37/26* | (2006.01) | |
| *B29C 63/02* | (2006.01) | |
| *B29C 63/00* | (2006.01) | |
| *B29L 31/34* | (2006.01) | |

(52) U.S. Cl.
CPC .......... *B32B 37/0053* (2013.01); *B32B 37/18* (2013.01); *B32B 37/187* (2013.01); *B32B 37/26* (2013.01); *B32B 38/162* (2013.01); *B29C 2063/0008* (2013.01); *B29L 2031/3437* (2013.01); *B29L 2031/3475* (2013.01); *B32B 2037/268* (2013.01); *B32B 2457/20* (2013.01); *Y10T 156/14* (2015.01); *Y10T 156/16* (2015.01)

(58) Field of Classification Search
CPC ... B32B 37/0053; B32B 37/26; B32B 37/187; B32B 37/18; B32B 38/1833; B32B 38/162; B32B 2457/20; B32B 2037/268; B32B 37/0046; B32B 7/06; B32B 37/003; B32B 37/10; B32B 2367/00; B29L 2031/3437; B29L 2031/3475; Y10T 156/14; Y10T 156/16; Y10T 156/17; Y10T 156/1702; Y10T 428/14; Y10T 428/1471; Y10T 428/1476
See application file for complete search history.

(56) References Cited

U.S. PATENT DOCUMENTS

| | | |
|---|---|---|
| 5,069,732 A | 12/1991 | Levine |
| 5,680,709 A | 10/1997 | Stone |
| 6,406,758 B1 | 6/2002 | Bottari et al. |
| 7,084,859 B1 | 8/2006 | Pryor |
| D598,024 S | 8/2009 | Scott et al. |
| D601,959 S | 10/2009 | Lee |
| D601,960 S | 10/2009 | Dai |
| 7,697,827 B2 | 4/2010 | Konicek |
| 7,957,524 B2 | 6/2011 | Chipping |
| 7,966,861 B2 | 6/2011 | Yee et al. |
| 8,047,365 B1 | 11/2011 | Lin |
| D651,214 S | 12/2011 | Yoo et al. |
| D665,809 S | 8/2012 | Wang et al. |
| 8,369,072 B1 | 2/2013 | Alonzo et al. |
| 8,393,377 B2 | 3/2013 | Patel et al. |
| 8,517,367 B1 | 8/2013 | Napier |
| D690,704 S | 10/2013 | Padilla et al. |
| 8,564,538 B2 | 10/2013 | Wadsworth |
| D707,217 S | 6/2014 | Toulotte |
| D710,843 S | 8/2014 | Akana |
| D714,053 S | 9/2014 | Yoo |
| D715,301 S | 10/2014 | Ashcraft et al. |
| D720,353 S | 12/2014 | Nakamura |
| D721,359 S | 1/2015 | Kim |
| D729,235 S | 5/2015 | Nagao et al. |
| 9,089,085 B2 | 7/2015 | Patel et al. |
| 9,159,260 B2 | 10/2015 | Oh |
| D751,556 S | 3/2016 | Conley et al. |
| D751,557 S | 3/2016 | Lane |
| D759,640 S | 6/2016 | Wadsworth |
| 2002/0054030 A1 | 5/2002 | Murphy |
| 2004/0109096 A1 | 6/2004 | Anderson et al. |
| 2004/0246386 A1 | 12/2004 | Thomas et al. |
| 2005/0030296 A1 | 2/2005 | Stohrer et al. |
| 2005/0164148 A1 | 7/2005 | Sinclair |
| 2007/0013662 A1 | 1/2007 | Fauth |
| 2007/0058990 A1 | 3/2007 | Weaver et al. |
| 2007/0115621 A1 | 5/2007 | Guillen |
| 2007/0229962 A1 | 10/2007 | Mason, Jr. |
| 2007/0247793 A1 | 10/2007 | Carnevali |
| 2007/0293282 A1 | 12/2007 | Lewis et al. |
| 2009/0186181 A1 | 7/2009 | Mase |
| 2009/0314400 A1 | 12/2009 | Liu |
| 2010/0309152 A1 | 12/2010 | Kusuda et al. |
| 2011/0206887 A1 | 8/2011 | Kim |
| 2011/0267793 A1 | 11/2011 | Cohen |
| 2011/0279383 A1 | 11/2011 | Wilson et al. |
| 2011/0309608 A1 | 12/2011 | Flynn et al. |
| 2012/0043015 A1 | 2/2012 | Feller |
| 2012/0076967 A1* | 3/2012 | Muramatsu ............ C09J 7/0232 428/41.8 |
| 2012/0087072 A1 | 4/2012 | McGuire et al. |
| 2012/0110868 A1 | 5/2012 | Abbondanzio |
| 2012/0183712 A1 | 7/2012 | Leonhard et al. |
| 2012/0211168 A1 | 8/2012 | Patel et al. |
| 2012/0268394 A1 | 10/2012 | Hsu et al. |
| 2012/0276318 A1 | 11/2012 | Franke |
| 2013/0020005 A1 | 1/2013 | Koblick et al. |
| 2013/0040088 A1 | 2/2013 | Hirayama et al. |
| 2013/0048203 A1 | 2/2013 | Yau et al. |
| 2013/0156999 A1 | 6/2013 | Braesch et al. |
| 2013/0184845 A1 | 7/2013 | Hales |
| 2013/0264235 A1 | 10/2013 | Lin |
| 2014/0055927 A1 | 2/2014 | Wang |
| 2015/0000831 A1 | 1/2015 | Wang |
| 2015/0041069 A1 | 2/2015 | Wadsworth et al. |
| 2015/0047773 A1 | 2/2015 | Wadsworth et al. |
| 2015/0107767 A1 | 4/2015 | Wadsworth et al. |

FOREIGN PATENT DOCUMENTS

| | | |
|---|---|---|
| CN | 202623469 | 12/2012 |
| CN | 202896928 | 4/2013 |
| CN | 202967060 | 6/2013 |
| JP | 10199422 | 7/1998 |
| JP | 2002049327 | 2/2002 |
| JP | 2002057764 | 2/2002 |
| JP | 2003066419 | 3/2003 |
| JP | 2006145918 | 6/2006 |
| JP | 2006155452 | 6/2006 |
| JP | 3124275 | 8/2006 |
| JP | 03180690 | 12/2012 |
| KR | 20-0454225 | 6/2011 |
| KR | 101080018 | 11/2011 |
| KR | 101135144 | 4/2012 |
| KR | 101176316 | 8/2012 |
| KR | 10-2013-0043720 | 5/2013 |
| KR | 300704457 | 8/2013 |
| KR | 300704458 | 8/2013 |
| KR | 300704459 | 8/2013 |
| KR | 300704460 | 8/2013 |
| KR | 1020130092713 | 8/2013 |
| KR | 1020130092804 | 8/2013 |
| KR | 300720375 | 12/2013 |
| KR | 300720376 | 12/2013 |
| KR | 101408663 | 6/2014 |
| KR | 1020140070046 | 6/2014 |
| KR | 1020140076245 | 6/2014 |
| KR | 101468710 | 12/2014 |
| KR | 200475419 | 12/2014 |
| KR | 200475420 | 12/2014 |
| KR | 1020140136596 | 12/2014 |
| KR | 1020140142904 | 12/2014 |
| KR | 1020140143262 | 12/2014 |
| KR | 1020150006910 | 1/2015 |
| KR | 200476916 | 4/2015 |
| KR | 1020150039292 | 4/2015 |
| KR | 2020150001663 | 5/2015 |
| KR | 300804459 | 7/2015 |
| KR | 1020160022665 | 3/2016 |
| KR | 1020160022755 | 3/2016 |
| KR | 1020160061078 | 5/2016 |
| KR | 1020160088067 | 7/2016 |
| KR | 1020160091491 | 8/2016 |
| KR | 2020170000128 | 1/2017 |

(56) References Cited

FOREIGN PATENT DOCUMENTS

| TW | I401223 | 7/2013 |
|---|---|---|
| WO | 2004-005141 | 1/2004 |
| WO | 2005058705 | 6/2005 |
| WO | WO2011065796 | 6/2011 |
| WO | 2011163151 | 12/2011 |
| WO | 2012074802 | 6/2012 |

OTHER PUBLICATIONS

MyScreenPROTECTOR—https://www.myscreenprotector.com/?Ing=3&view=cms&txt=about-my-screen-protector, Mar. 21, 2014.
PureGear—PureTek Roll-On Kit—http://www.pure-gear.com/shop-by-category/screen/puretek-roll-on-kit-antibacterial-antiglare-anti-fingerprint.html, Mar. 21, 2014.
TYLT ALIN Perfect Alignment Screen Protection—http://www.tylt.com/alin/, Mar. 21, 2014.
ZAGG Introduces invisibleSHIELD On Demand and invisible Shield Glass at CES 2—http://investors.zagg.com/releasedetail.cfm?ReleaseID=817526, Mar. 21, 2014.
International Search Report for Application No. PCT/US 09/61553, dated Dec. 17, 2009.
Protrusion on "F" key of computer keyboard; 1 page; picture taken Oct. 20, 2008.
Protrusion on "5" key of telephone; 1 page; picture taken Oct. 20, 2008.
Systech Displays, Inc.; Home page; http://www.systechdisplays.com/; Oct. 21, 2008; 2 pages.

\* cited by examiner

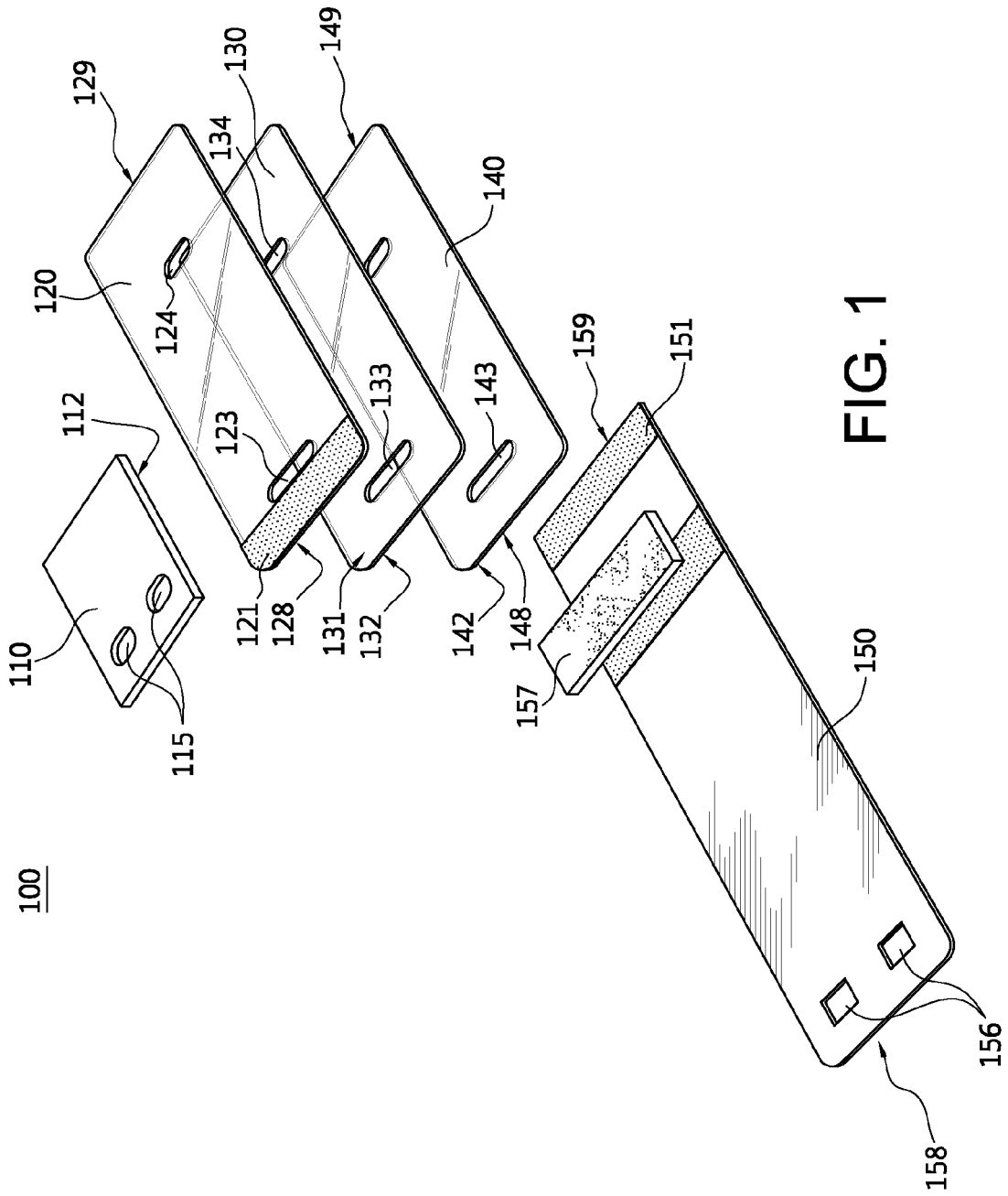

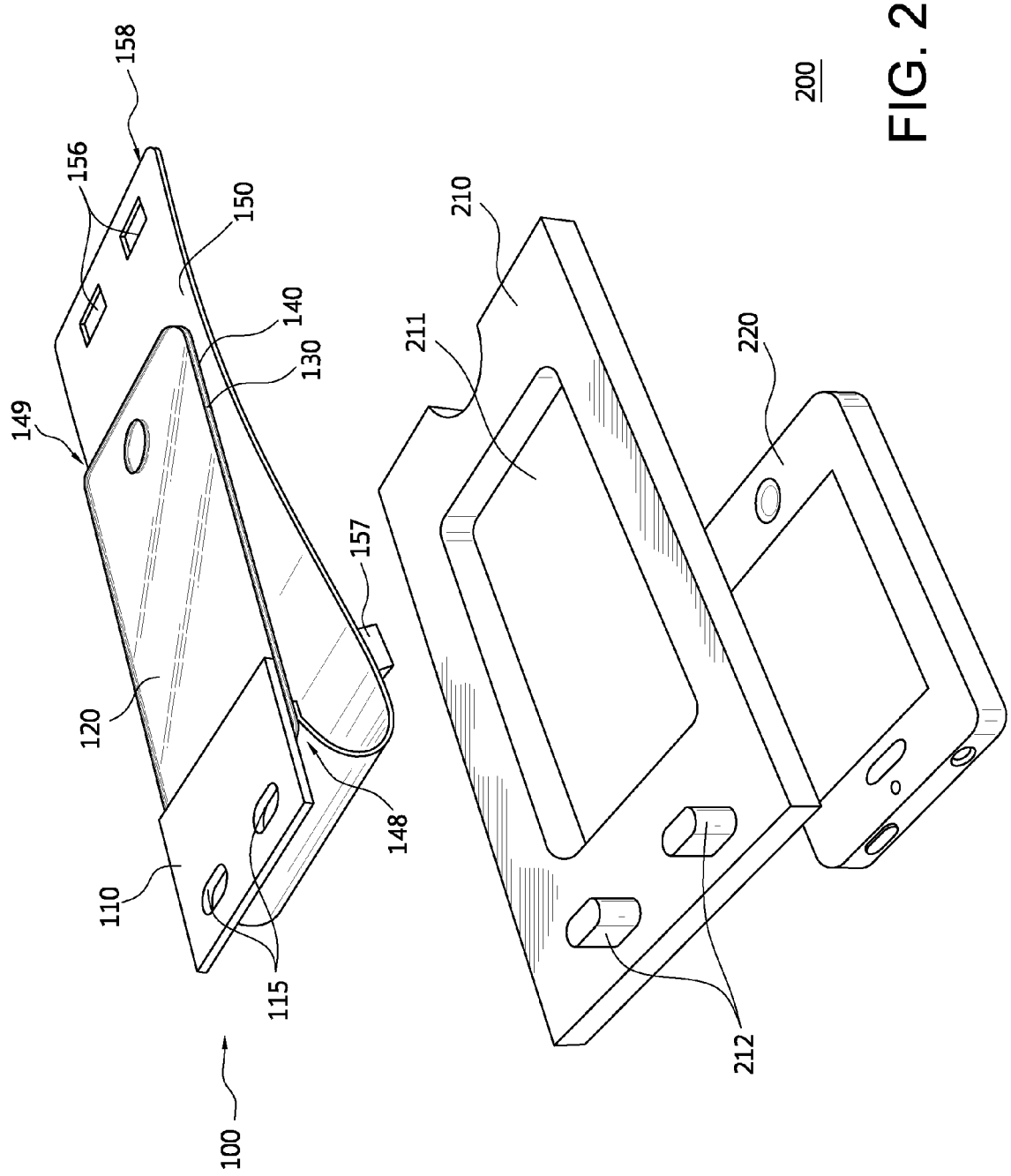

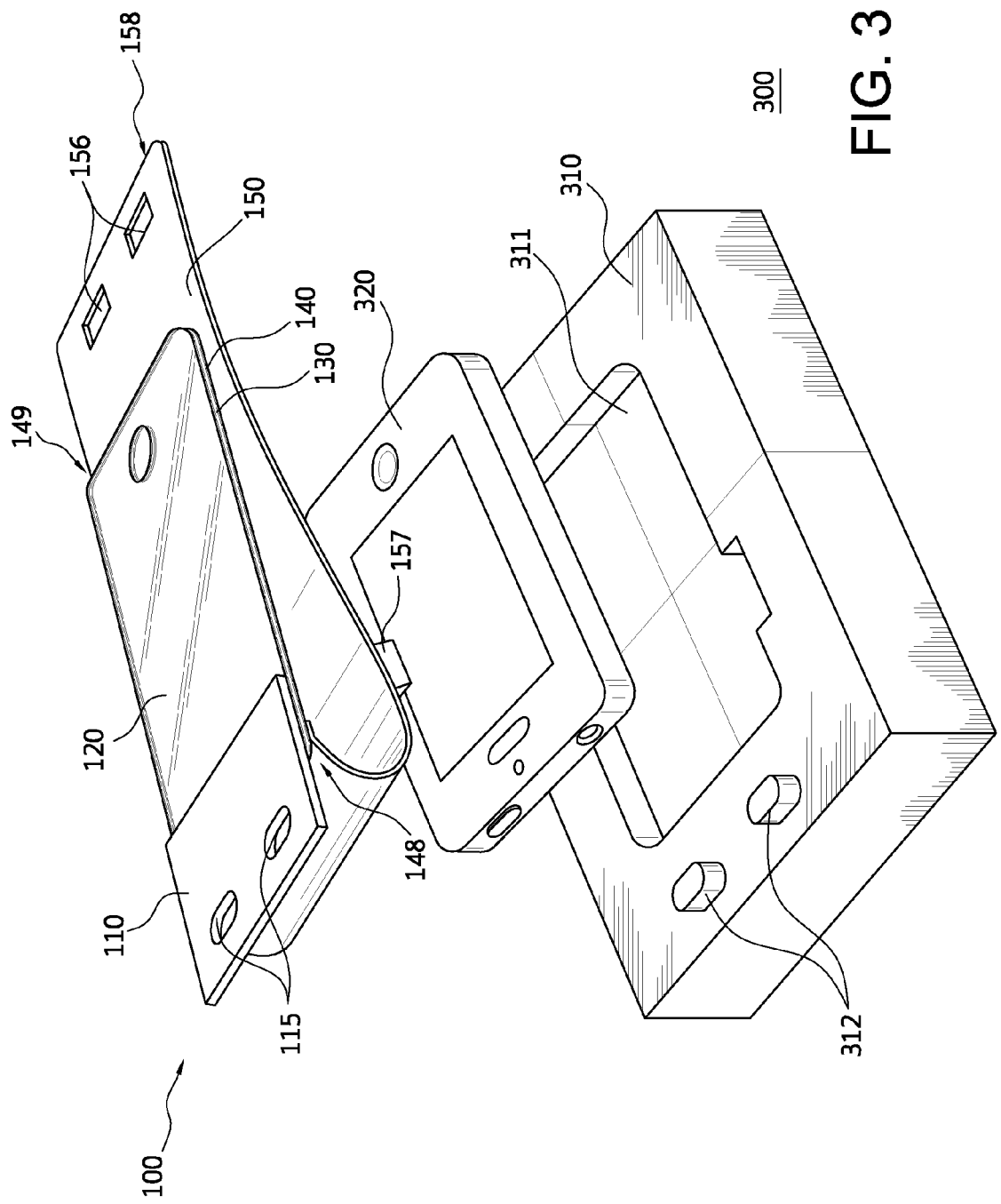

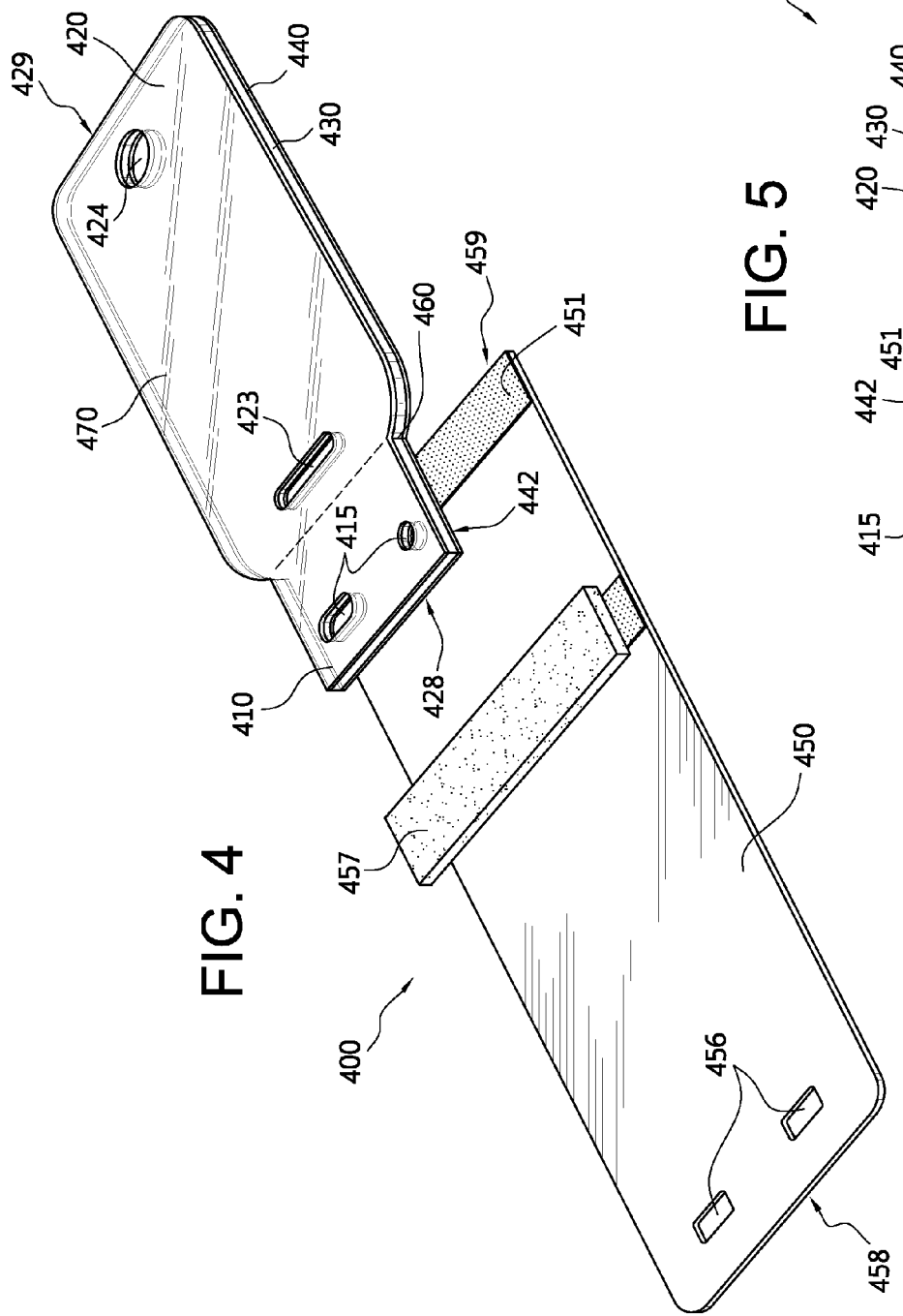
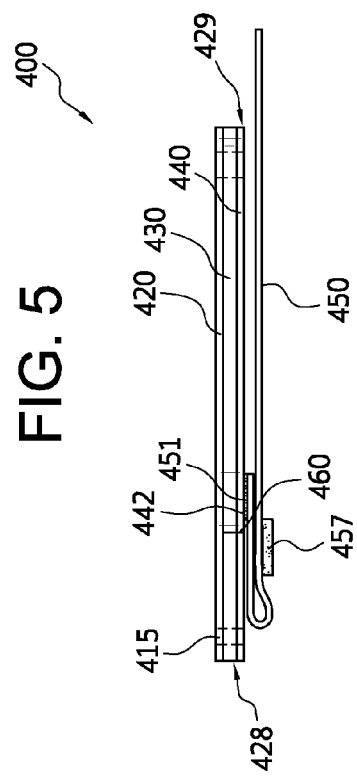

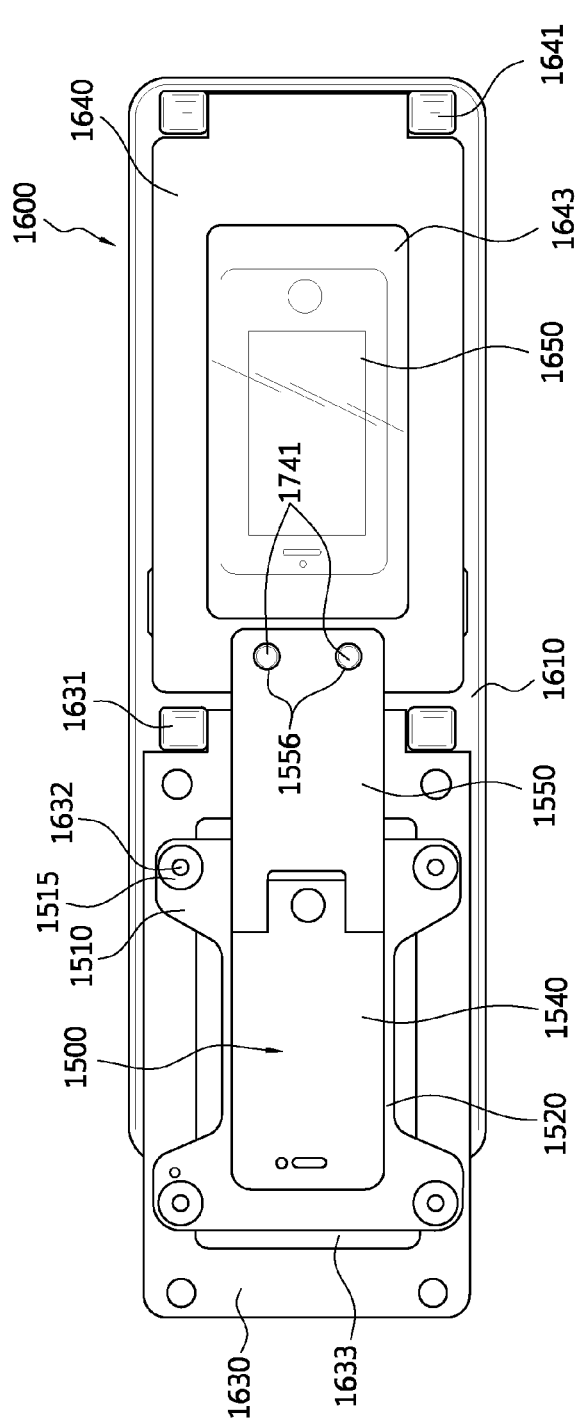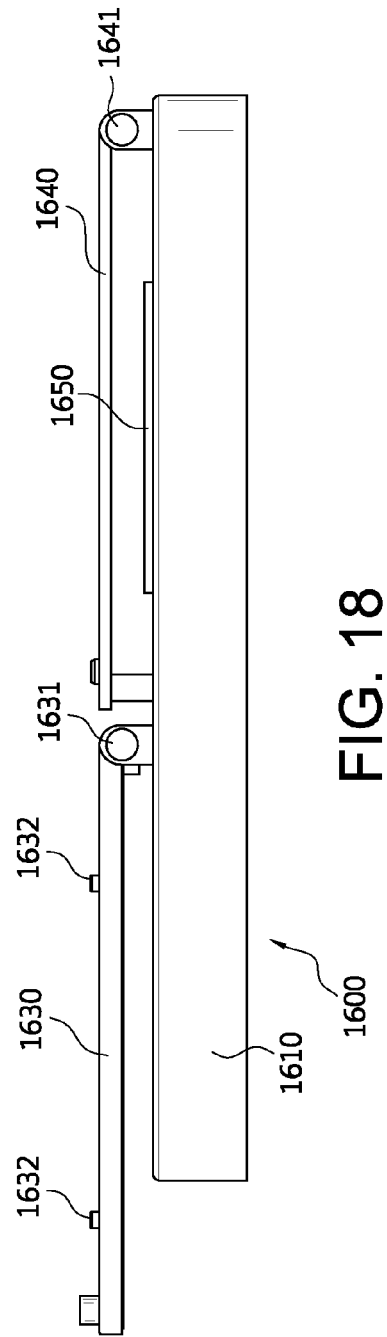

OVERLAY APPLICATOR AND METHOD OF USING THE SAME

CROSS-REFERENCE TO RELATED APPLICATIONS

This application claims the benefit of U.S. Provisional Application No. 61/863,895, filed Aug. 8, 2013; U.S. Provisional Application No. 61/871,864, filed Aug. 29, 2013; and U.S. Provisional Application No. 61/890,271, filed Oct. 13, 2013. U.S. Provisional Application Nos. 61/863,895, 61/871,864, and 61/890,271 are incorporated herein by reference in their entirety.

TECHNICAL FIELD

This disclosure relates generally to overlays, and relates more particularly to overlay applicators and related machines and cradles applying overlays to electronic devices.

BACKGROUND

Electronic devices, such as smartphones, tablet computing devices, media players, etc., have gained widespread popularity. These devices generally have screens, and many of these devices have touchscreens, such as capacitive touchscreens. To protect these screens, many manufacturers now produce clear film overlays, which can be applied to the screens to keep the screens clear and protect against damage, such as accidental scratching. Many of these films include a self-wetting adhesive to adhere to the screens of the electronic devices. Oftentimes, application of an overlay to the screen of a device results in misalignment of the overlay on the device, air bubbles between the overlay and the screen of the device, and/or dirt (such as dust, fingerprints, oil, and/or other particulates) between the overlay and the screen of the device.

BRIEF DESCRIPTION OF THE DRAWINGS

To facilitate further description of the embodiments, the following drawings are provided in which:

FIG. 1 illustrates an exploded isometric view of an overlay applicator, according to an embodiment;

FIG. 2 illustrates an isometric view of a system for using the overlay applicator of FIG. 1 to apply an overlay to a device with a frame, according to another embodiment;

FIG. 3 illustrates an isometric view of a system for using the overlay applicator of FIG. 1 to apply an overlay to a device with a cradle, according to another embodiment;

FIG. 4 illustrates an exploded isometric view of an overlay applicator, according to another embodiment;

FIG. 5 illustrates a side view of the overlay applicator of FIG. 4;

FIG. 17 illustrates a top view of the machine of FIG. 16 in a second configuration;

FIG. 18 illustrates a side view of the machine of FIG. 16 in a second configuration;

Figure 6:
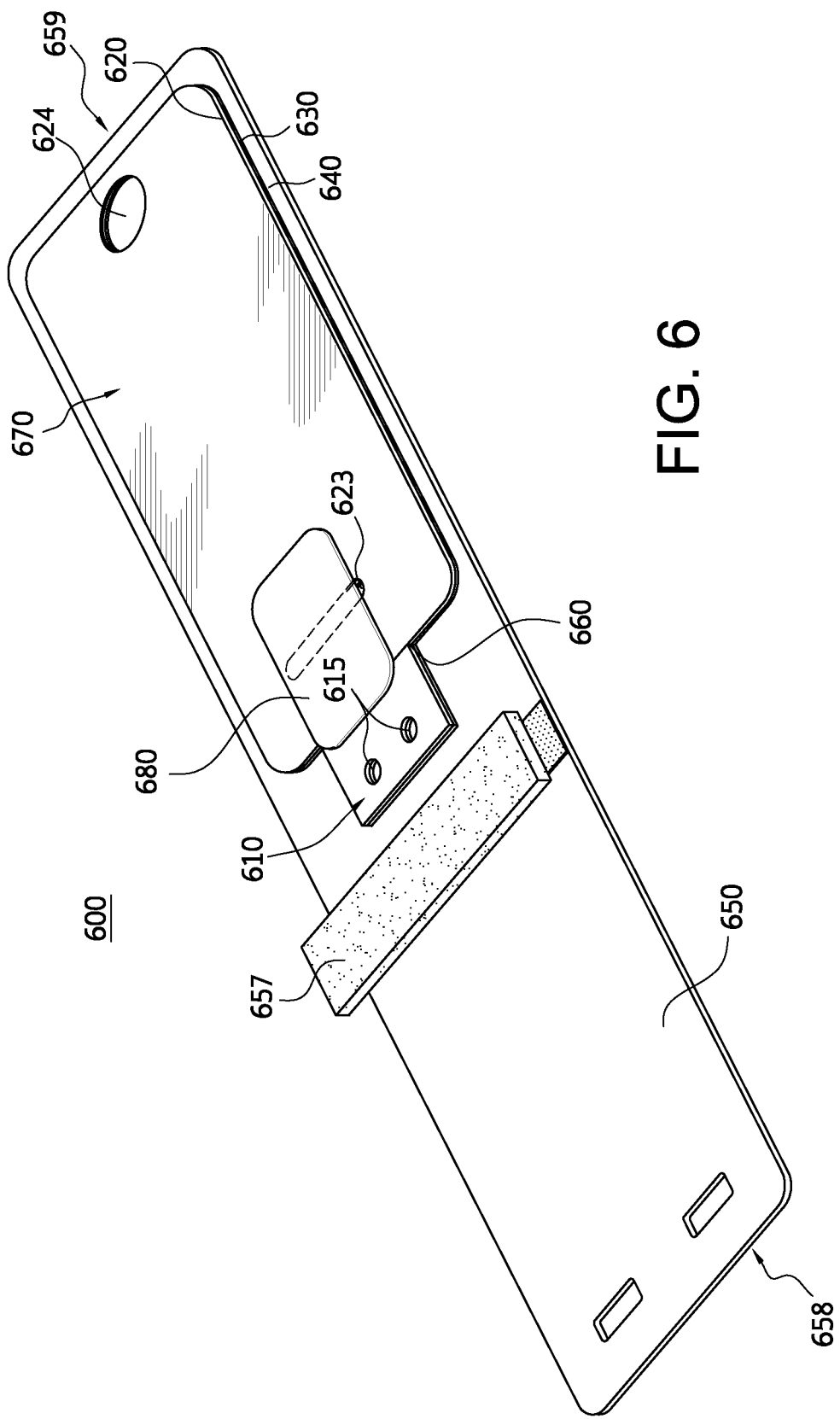
FIG. 6 illustrates an isometric view of an overlay applicator, according to another embodiment.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable. "Mechanical coupling" and the like should be broadly understood and include mechanical coupling of all types.

The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Various embodiments include an overlay applicator. The overlay applicator can include an overlay. The overlay can include a top side and a bottom side. The bottom side can include an adhesive agent configured to adhere to a screen of an electronic device. The overlay applicator also can include an adhesive release liner. The adhesive release liner can include a top side and a bottom side. The top side of the adhesive release liner can be removably attached to the bottom side of the overlay. The adhesive release liner can be configured to protect the adhesive agent at the bottom side of the overlay from contaminants. The overlay applicator further can include a protective film removably attached to the top side of the overlay. The overlay applicator also can include an alignment tab. The alignment tab can include an alignment mechanism. The overlay applicator further can include a pull tab. The pull can include a wiper. The pull tab, including the wiper, and the adhesive release liner can be configured such that the pull tab can be folded across the bottom side of the adhesive release liner and can be pulled to remove the adhesive release liner from the bottom side of the overlay to expose the adhesive agent. The pull tab, including the wiper, and the adhesive release liner can be configured such that, when the pull tab is pulled, the wiper can be configured to wipe across and clean the screen of the electronic device.

A number of embodiments can include a method of providing an overlay applicator. The method can include providing an overlay. The overlay can include a top side and a bottom side. The bottom side can include an adhesive agent configured to adhere to a screen of an electronic device. The method also can include providing an adhesive release liner. The adhesive release liner can include a top side and a bottom side. The top side of the adhesive release liner can be removably attached to the bottom side of the overlay. The adhesive release liner can be configured to protect the adhesive agent at the bottom side of the overlay from contaminants. The method further can include providing a protective film removably attached to the top side of the overlay. The method also can include providing an alignment tab. The alignment tab can include an alignment mechanism. The method further can include providing a pull tab. The pull tab can include a wiper. The pull tab, including the wiper, and the adhesive release liner can be configured such that the pull tab can be folded across the bottom side of the adhesive release liner and can be pulled to remove the adhesive release liner from the bottom side of the overlay to expose the adhesive agent. The pull tab, including the wiper, and the adhesive release liner can be configured such that, when the pull tab is pulled, the wiper can be configured to wipe across and clean the screen of the electronic device.

Some embodiments include a machine. The machine can include a base. The machine also can include a carriage. The carriage can include a first cradle configured to securely hold a first electronic device. The carriage also can include an alignment base configured to engage with an alignment mechanism of an overlay applicator. The machine further can include a handle assembly. The handle assemble can include a handle and a pulling mechanism configured to engage with a pull tab of the overlay applicator. The machine can be configured such that the handle assembly can be pulled in a first direction relative to the base from a first handle position to a second handle position. The machine can be configured such that when the handle assembly is moved from the first handle position to the second handle position, the carriage can move in a second direction relative to the base from a first carriage position to a second carriage position. The second direction can be opposite the first direction. The machine can be configured such that when (a) the alignment base is engaged with the alignment mechanism of the overlay applicator, (b) the pulling mechanism is engaged with the pull tab of the overlay applicator, (c) the first cradle is holding the first electronic device, and (d) the handle assembly is pulled in the first direction relative to the base from the first handle position to the second handle position, an adhesive release liner of the overlay applicator can be removed from an overlay of the overlay applicator starting at a leading edge of the overlay and continuing to a trailing edge of the overlay to expose an adhesive agent of the overlay to a screen of the first electronic device.

Many embodiments include a method of providing a machine. The method can include providing a base. The method also can include providing a carriage. The carriage can include a first cradle configured to securely hold a first electronic device. The carriage also can include an alignment base configured to engage with an alignment mechanism of an overlay applicator. The method further can include providing a handle assembly. The handle assembly can include a handle and a pulling mechanism configured to engage with a pull tab of the overlay applicator. The machine can be configured such that the handle assembly can be pulled in a first direction relative to the base from a first handle position to a second handle position. The machine can be configured such that when the handle assembly is moved from the first handle position to the second handle position, the carriage can move in a second direction relative to the base from a first carriage position to a second carriage position. The second direction can be opposite the first direction. The machine can be configured such that when (a) the alignment base is engaged with the alignment mechanism of the overlay applicator, (b) the pulling mechanism is engaged with the pull tab of the overlay applicator, (c) the first cradle is holding the first electronic device, and (d) the handle assembly is pulled in the first direction relative to the base from the first handle position to the second handle position, an adhesive release liner of the overlay applicator can be removed from an overlay of the overlay applicator starting at a leading edge of the overlay and continuing to a trailing edge of the overlay to expose an adhesive agent of the overlay of the overlay applicator to a screen of the first electronic device.

Several embodiments include a machine. The machine can include a base. The machine also can include a cradle configured to securely hold a first electronic device. The machine further can include an alignment piece hingedly attached to the base. The alignment piece can include an alignment base configured to engage with an alignment mechanism of an overlay applicator. The machine also can include a pulling piece hingedly attached to the base. The pulling piece can include a pulling mechanism configured to engage with a pull tab of the overlay applicator. The machine can be configured such that the pulling piece can be rotated relative to the base in a first direction from a first pulling piece position to a second pulling piece position. The first pulling piece position can be proximate to the cradle. The machine can be configured such that the alignment piece can be rotated relative to the base in the first direction from a first alignment piece position to a second alignment piece position. The second alignment piece position can be proximate to the cradle. The machine can be configured such that when (a) the alignment base is engaged with the alignment mechanism of the overlay applicator, (b) the pulling mechanism is engaged with the pull tab of the overlay applicator, (c) the cradle is holding the first electronic device, and (d) the pulling piece is rotated relative to the base in the first direction from the first pulling piece position to the second pulling piece position, the alignment piece can be rotated relative to the base in the first direction from the first alignment piece position to the second alignment piece position, and an adhesive release liner of the overlay applicator can be removed from an overlay of the overlay applicator to expose an adhesive agent of an overlay to a screen of the first electronic device.

Further embodiments include a method of providing a machine. The method can include providing a base. The method also can include providing a cradle configured to securely hold a first electronic device. The method further can include providing an alignment piece hingedly attached to the base. The alignment piece can include an alignment base configured to engage with an alignment mechanism of an overlay applicator. The method also can include providing a pulling piece hingedly attached to the base. The pulling piece can include a pulling mechanism configured to engage with a pull tab of the overlay applicator. The machine can be configured such that the pulling piece can be rotated relative to the base in a first direction from a first pulling piece position to a second pulling piece position. The first pulling piece position can be proximate to the cradle. The machine can be configured such that the alignment piece can be rotated relative to the base in the first direction from a first alignment piece position to a second alignment piece position. The second alignment piece position can be proximate to the cradle. The machine can be configured such that when (a) the alignment base is engaged with the alignment mechanism of the overlay applicator, (b) the pulling mechanism is engaged with the pull tab of the overlay applicator, (c) the cradle is holding the first electronic device, and (d) the pulling piece is rotated relative to the base in the first direction from the first pulling piece position to the second pulling piece position, the alignment piece can be rotated relative to the base in the first direction from the first alignment piece position to the second alignment piece position to pull the pull tab of the overlay applicator, and an adhesive release liner of the overlay applicator can be removed from an overlay of the overlay applicator to expose an adhesive agent of an overlay to a screen of the first electronic device.

Yet further embodiments include a method of using an overlay applicator to apply an overlay to a screen of an electronic device. The method can include attaching the overlay applicator to a first apparatus securely holding the electronic device. The overlay applicator can include an overlay. The overlay can include a top side and a bottom side. The bottom side can include an adhesive agent configured to adhere to the screen of the electronic device. The overlay applicator also can include an adhesive release liner. The adhesive release liner can include a top side and a bottom side. The top side of the adhesive release liner can be removably attached to the bottom side of the overlay. The adhesive release liner can be configured to protect the adhesive agent at the bottom side of the overlay from contaminants. The overlay applicator further can include protective film removably attached to the top side of the overlay. The overlay applicator also can include an alignment tab. The alignment tab can include an alignment mechanism configured to engage with an alignment base of the first apparatus. The overlay applicator further can include a pull tab. The pull can include a wiper. The method also can include pulling the pull tab across the bottom side of the adhesive release liner to remove the adhesive release liner from the bottom side of the overlay to expose the adhesive agent to the screen of the electronic device.

Embodiments of an overlay applicator can be configured to facilitate application of an overlay on the screen of a device. In some embodiments, the overlay applicator can be configured to facilitate removing dust from the screen of the device immediately before application. In certain embodiments, the overlay applicator can facilitate keeping dust and fingerprints from coming into contact with adhesive on the overlay. In various embodiments, the overlay applicator can be configured to facilitate alignment of the overlay with the screen of the device during application.

Turning to the drawings, FIG. 1 illustrates an exploded view showing various elements of an overlay applicator 100. Overlay applicator 100 is merely exemplary and embodiments of the overlay applicator are not limited to embodiments presented herein. The overlay applicator can be employed in many different embodiments or examples not specifically depicted or described herein. In a number of embodiments, overlay applicator 100 can include an alignment tab 110, a protective film 120, an overlay 130, an adhesive release liner 140, and/or a pull tab 150. Overlay 130 can be a protective film for protecting the screen of an electronic device, such as a mobile phone, a tablet computer, or a smart phone, such as an iPhone, developed and sold by Apple, Inc., of Cupertino, Calif., among other devices. Overlay 130 can be made of polyethylene terephthalate (PET) or another suitable material. Overlay 130 can have dimensions such that it partially or fully covers the screen of the electronic device. In some embodiments, overlay 130 can have one or more holes, slots, or apertures. For example, overlay 130 can include a speaker slot 133, which can allow sound from a speaker on the device to pass through overlay 130. Overlay 130 can include a button slot 134, which can allow a user to push a button on the face of the device without touching, stretching, or otherwise affecting overlay 130. Overlay 130 can include a top side 131 and a bottom side 132. In some embodiments, top side 131 can include a hard coating. In certain embodiments, top side 131 can include an optical coating. In many embodiments, bottom side 132 can include an adhesive agent to adhere overlay 130 to the screen of the device.

In a number of embodiments, protective film 120 can be attached to top side 131 of overlay 130. In many embodiments, protective film 120 can have dimensions substantially similar to the dimensions of overlay 130. Protective film 120 can have a first side 129 and a second side 128. Protective film 120 can provide protection for the hard coating or optical coating on overlay 130 during installation of overlay 130 on the device. In some embodiments, protective film 120 can be a thick flexible film and can have a thickness of approximately 0.1 to approximately 0.4 millimeters (mm), for example. In many embodiments, protective film 120 does not stretch or distort, which can advantageously facilitate alignment of overlay 130 on the device. In a number of embodiments, protective film 120 can be made of a suitable plastic or paper, or another suitable material. Protective film 120 can be configured such that it can be peeled away from top side 131 of overlay 130. In certain embodiments, protective film 120 can include one of more holes, slots, or apertures. For example, protective film 120 can include a speaker slot 123 and a button slot 124, which can be aligned with speaker slot 133 and button slot 134 when protective film 120 is attached to overlay 130.

In some embodiments, protective film 120 can include an adhesive region 121, which can be adhered to alignment tab 110 at an adhesive region 112. In many embodiments, protective film 120 can be removably attached to top side 131 of overlay 130. In certain embodiments, adhesive region 121 of protective film 120 can be adhered to adhesive region 112 of alignment tab 110 using an adhesive agent. In some embodiments, protective film 120 can be attached to alignment tab 110 using a suitable fastening mechanism, such as one or more rivets or hook and loop tape, as examples. When alignment tab 110 is attached to protective film 120, alignment tab 110 can extend beyond protective film 120, in some embodiments, such that a portion of alignment tab 110 is not adhered to or touching protective film 120. In some embodiments, alignment tab 110 can include an alignment mechanism 115 at the portion of alignment tab 110 that is not adhered to or touching protective film 120. Alignment mechanism 115 can facilitate aligning alignment tab 110, protective film 120, and overlay 130 with various features of the device during application of overlay 130. Alignment mechanism 115 can be one or more holes, slots, or other suitable alignment aid features. In some embodiments, alignment tab 110 does not stretch or distort, which can help facilitate accurate alignment of overlay 130 on the device. Alignment tab 110 can be made of plastic or cardboard, and can be thicker than protective film 120. In certain embodiments, protective film 120 and at least at portion of alignment tab 110 can be integral, or in other words, made of the same piece of material. In such embodiments, protective film 120 can be made of a thicker material, such as alignment tab 110, so as to provide sufficient structural support for alignment mechanism 115.

In a number of embodiments, adhesive release liner 140 can be attached to bottom side 132 of overlay 130. In many embodiments, adhesive release liner 140 can have dimensions substantially similar to the dimensions of overlay 130. Adhesive release liner 140 can have a first side 149 and a second side 148. By being attached to bottom side 132 of overlay 130, adhesive release liner 140 can keep the adhesive agent on bottom side 132 covered and protected until the overlay 130 is ready to be adhered to the screen of the device. In many embodiments, a top side of adhesive release liner 140 can be removably attached to bottom side 132 of overlay 130, and/or can be configured to protect the adhesive agent on bottom side 132 of overlay 130 from contaminants. In some embodiments, adhesive release liner 140 can be a thin flexible film and can have a thickness of approximately 0.1 mm to approximately 0.25 mm. In certain embodiments, adhesive release liner 140 can be made of a material that can stretch and/or distort. In certain other embodiments, adhesive release liner 140 can be made of a material that does not stretch or distort. In a number of embodiments, adhesive release liner 140 can be made of a suitable thin plastic film or paper, or another suitable material. Adhesive release liner 140 can be configured such that it can be peeled away from bottom side 132 of overlay 130. In certain embodiments, adhesive release liner 140 can include one of more holes, slots, or apertures. For example, adhesive release liner 140 can include a speaker slot 143 and a button slot 144, which can be aligned with speaker slot 133 and button slot 134 when adhesive release liner 140 is attached to overlay 130.

In some embodiments, pull tab 150 can facilitate removal of adhesive release liner 140. Pull tab 150 can include a first side 159 and a second side 158. In some embodiments, adhesive release liner 140 can include an adhesive region 142 at second side 148, which can be adhered to pull tab 150 at an adhesive region 151 at first side 159. In certain embodiments, adhesive region 142 of adhesive release liner 140 can be adhered to adhesive region 151 of pull tab 150 using an adhesive agent. In other embodiments, adhesive release liner 140 can be attached to pull tab 150 using another suitable fastening mechanism, such as rivets or hook and loop tape. When pull tab 150 is attached to adhesive release liner 140, alignment tab 110 can extend beyond adhesive release liner 140, such that a portion of pull tab 150 is not adhered to or touching adhesive release liner 140. In a number of embodiments, pull tab 150 can have a dimension such that a distance from first side 159 to second side 158 of pull tab 150 is longer than a dimension from first side 149 to second side 148 of adhesive release liner 140. In many embodiments, when pull tab 150 is attached to adhesive release liner 140, pull tab 150 can be folded back near first side 159 and can extend across the length of and beyond first side 149 of adhesive release liner 140. In a number of embodiments, pull tab 150 can be folded across the bottom side of adhesive release liner 140 and pulled to remove adhesive release liner 140 from bottom side 132 of overlay 130 to expose the adhesive agent. Pull tab 150 can be made of a flexible plastic or paper, or another suitable material. In certain embodiments, adhesive release liner 140 and pull tab 150 can be integral. In such embodiments, adhesive release liner 140 can be made of a thicker material, pull tab 150, so as to provide sufficient structural support for pulling on adhesive release liner 140.

In some embodiments, pull tab 150 can include a pulling aid 156. Pulling aid 156 can facilitate pulling pull tab 150, and can be or include one or more holes, slots, grooves, ridges, channels, etc. For example, pulling aid 156 can be two holes in which a user can place two fingers to assist in pulling pull tab 150 or in which an applicator machine can insert tabs to engage with pull tab 150. Pulling aid 156 can also assist a user in differentiating the ends of pull tab 150 and in knowing which end to pull when installing overlay 130 on the device.

In many embodiments, overlay applicator 100 and/or pull tab 150 can include a wiper 157. Wiper 157 can remove dust from the screen of the device and can facilitate application of overlay 130 to the screen of the device without dust between overlay 130 and the screen. In a number of embodiments, wiper 157 can be adhered to a top side of pull tab 150. Wiper 157 can be made of microfiber cloth, soft silicone, an extruded rubber profile wiper blade, and/or other suitable materials. In various embodiments, wiper 157 can be a solid block, a row of fins, or of another suitable form for cleaning the screen of the device. In many embodiments, wiper 157 can be configured such that when pull tab 150 is pulled, wiper 157 can wipe across and clean the screen of the device, as described below in further detail. In a number of embodiments, the wiper can be configured to wipe across a length of the screen of the device. In some embodiments, the length of the screen of the device can be greater than a width of the screen of the device.

In many embodiments, overlay applicator 100 can be manufactured such that protective film 120, overlay 130, and adhesive release liner 140 are each attached and are coterminous with each other. For example, protective film 120, overlay 130, and adhesive release liner 140 can be attached and then cut, such that the sides and other features of protective film 120, overlay 130, and adhesive release liner 140 are aligned. Alignment tab 110 can then be adhered to protective film 120, and pull tab 150 can be adhered to adhesive release liner 140. In certain embodiments, as described above, protective film 120 and at least a portion of alignment tab 110 can be integral. For example, adhesive release liner 140 can be adhered to overlay 130 and overlay can be adhered to protective film 120, and overlay 130 and adhesive release liner 140 can be cut to size without cutting protective film 120.

Turning ahead in the drawings, FIG. 2 illustrates a system 200 for using overlay applicator 100 to apply overlay 130 to a device. System 200 is merely exemplary and embodiments of the system are not limited to embodiments presented herein. The system can be employed in many different embodiments or examples not specifically depicted or described herein. System 200 can include overlay applicator 100, a frame 210, and a device 220 (e.g., a smart phone). Frame 210 can include a hole 211 in which device 220 can be placed with the screen of device 220 facing upwards. In some embodiments, hole 211 is conformal with device 220. In other embodiments, hole 211 can have dimensions large enough that it can fit around a several different electronic devices. Frame 210 can have a height substantially similar to the height of device 220. In many embodiments, frame 210 can include an alignment base 212, which can engage with alignment mechanism 115. In some embodiments, alignment base 212 can be one or more protrusions that can fit inside the one or more slots of alignment mechanism 115. Alignment base 212 and alignment mechanism 115 can be configured and positioned such that when alignment mechanism 115 is engaged with alignment base 212, overlay 130 can be positioned directly above the screen of the device, and aligned such that overlay 130 will be adhered in an accurate position on the screen when adhesive release liner 140 is removed.

In some embodiments, overlay applicator 100 can be used to apply overlay 130 to device 220 in frame 210. Pull tab 150 can be folded such that second side 158 of pull tab 150 is pulled under adhesive release liner 140 from second side 148 to first side 149, as shown in FIG. 2. Overlay applicator 100 can be placed on frame 210 such that alignment mechanism 115 engages with alignment base 212. Frame 210 can be placed over device 220 with the screen of device 220 facing up. In many embodiments, by placing frame 210 over device 200, wiper 157 can come in contact with the screen of device 220. While holding frame 210, a user can pull on pull tab 150, e.g., by using pulling aid 156, such that wiper 157 is pulled across the screen of device 220, which can remove dust or other particles from the screen of device 220. In a number of embodiments, as pull tab 150 is pulled, adhesive release liner 140 is removed from bottom side 132 (FIG. 1) of overlay 130, and overlay 130 adheres to the screen of device 220 in an accurately aligned position. After overlay 130 is adhered to the screen of device 220, the user can smooth overlay 130 on device 220 to remove any bubbles between overlay 130 and the screen of device 220. Protective film 120 can be removed from overlay 130. In some embodiments, protective film can be removed by lifting and/or pulling alignment tab 110. In many embodiments, protective film 120 is removed after smoothing out any bubbles, so that protective film 120 can prevent damage to overlay 130 from forceful pushing or rubbing involved in smoothing the bubbles. For example, optical coated overlays can be damaged by objects, such as credit cards, being used to smooth out bubbles. Device 220 can be removed from frame 210 with overlay 130 installed.

Turning ahead in the drawings, FIG. 3 illustrates a system 300 for using overlay applicator 100 to apply overlay 130 to a device. System 300 is merely exemplary and embodiments of the system are not limited to embodiments presented herein. The system can be employed in many different embodiments or examples not specifically depicted or described herein. System 300 can include overlay applicator 100, a cradle 310, and a device 320 (e.g., a smart phone). Cradle 310 can include a slot 311 in which device 320 can be placed with screen facing upwards. In some embodiments, slot 311 is conformal with device 320. In other embodiments, slot 311 can have dimensions large enough that several different electronic devices can fit within it. Slot 311 can have sides and a bottom, and cradle 310 can have a height greater than the height of device 320. In many embodiments, cradle 310 can include an alignment base 312, which can engage with alignment mechanism 115. In some embodiments, alignment base 312 can be one or more protrusions that can fit inside the one or more slots of alignment mechanism 115. Alignment base 312 and alignment mechanism 115 can be configured and positioned such that when alignment mechanism 115 is engaged with alignment base 312, overlay 130 can be positioned directly above the screen of the device, and aligned such that overlay 130 will be adhered in an accurate position on the screen when adhesive release liner 140 is removed.

In some embodiments, overlay applicator 100 can be used to apply overlay 130 to device 320 in cradle 310. Pull tab 150 can be folded such that second side 158 of pull tab 150 is pulled under adhesive release liner 140 from second side 148 to first side 149, as shown in FIG. 3. Device 320 can be placed in cradle 310, with the screen of device 320 facing up. Overlay applicator 100 can be placed on cradle 310 such that alignment mechanism 115 engages with alignment base 312. In many embodiments, by placing overlay applicator 110 on cradle 210, wiper 157 can come in contact with the screen of device 320. While holding cradle 310, a user can pull on pull tab 150, e.g., by using pulling aid 156, such that wiper 157 is pulled across the screen of device 320, which can remove dust or other particles from the screen of device 320. In a number of embodiments, as pull tab 150 is pulled, adhesive release liner 140 is removed from bottom side 132 (FIG. 1) of overlay 130, and overlay 130 adheres to the screen of device 320 in an accurately aligned position. After overlay 130 is adhered to the screen of device 320, the user can smooth overlay 130 on device 320 to remove any bubbles between overlay 130 and the screen of device 320. Protective film 120 can be removed from overlay 130. In some embodiments, protective film 120 can be removed by lifting and/or pulling alignment tab 110. In many embodiments, protective film 120 is removed after smoothing out any bubbles, so that protective film 120 can prevent damage to overlay 130 from forceful pushing or rubbing involved in smoothing the bubbles, as explained above. Device 320 can be removed from cradle 310 with overlay 130 installed.

In yet other embodiments, overlay applicator 100 can be used with a machine, such as the machine shown in FIGS. 8-14 and 16-20, and described below, which can semi-automatically align overlay applicator 100 with a device and engage with pull tab 150 and/or alignment tab 110 to install overlay 130 on the device.

Advantageously, overlay applicator 100 can be used to install overlay 130 without dust or particles between overlay 130 and the screen of the device. Frame 210 (FIG. 2) or frame 310 (FIG. 3) can be used with overlay applicator 100 to accurately position overlay 130 relative to features of the device. Advantageously, by wiping the screen of the device immediately before applying overlay 130, overlay applicator 100 can clean any dust or particles on the screen. Beneficially, by removing adhesive release liner 140 immediately before applying overlay 130 minimizes exposure of the adhesive agent on bottom side 132, which can prevent dust or other particles from coming in contact with the adhesive agent. As another advantage, by using pull tab 150 to remove adhesive release liner 140 and/or by holding overlay 130 in position by using alignment tab 110, a user does not need to hold the sides of overlay 130, which can prevent the user from inadvertent contact with the adhesive agent on bottom side 132 of overlay 130.

Turning ahead in the drawings, FIG. 4 illustrates an isometric view of an overlay applicator 400. FIG. 5 illustrates a side view of overlay applicator 400. Overlay applicator 400 is merely exemplary and embodiments of the overlay applicator are not limited to embodiments presented herein. The overlay applicator can be employed in many different embodiments or examples not specifically depicted or described herein. Overlay applicator 400 can be similar to overlay applicator 100 (FIG. 1), and various components and/or constructions of overlay applicator 400 can be substantially identical or similar to various components of overlay applicator 100 (FIG. 1). Overlay applicator 400 can include a protective film 420, an overlay 430, an adhesive release liner 440, and/or a pull tab 450. Protective film 420 can be similar to protective film 120 (FIG. 1), overlay 430 can be similar to overlay 130 (FIG. 1), adhesive release liner 440 can be similar to adhesive release liner 140 (FIG. 1), and/or pull tab 450 can be similar to pull tab 150 (FIG. 1).

In some embodiments, overlay applicator can include a speaker slot 423 and/or a button slot 424. Speaker slot 423 and/or button slot 424 can extend through protective film 420, overlay 430, and adhesive release liner 440. In a number of embodiments, overlay applicator 400 can include a device portion 470 and an alignment tab 410. Alignment tab 410 can be similar to alignment tab 110 (FIG. 1). In some embodiments, device portion 470 and alignment tab 410 can be made of the layers used for protective film 420, overlay 430, and adhesive release liner 440. Alignment tab 410 can include alignment mechanism 415. Alignment mechanism 415 can be one or more holes, slots, or other suitable alignment aid features, which can facilitate aligning alignment tab 410, protective film 420, overlay 430, and adhesive release liner 440 with various features of the device during application of overlay 430.

In many embodiments, construction of overlay applicator 400 can include adhering and/or attaching layers of material for protective film 420, overlay 430, and adhesive release liner 440. After attaching the layers, protective film 420, overlay 430, and adhesive release liner 440 can be cut to predetermined dimensions of device portion 470 and alignment tab 410. In some embodiments, the cutting of device portion 470 and alignment tab 410 to size can include cutting speaker slot 423, button slot 424, and/or alignment mechanism 415. As a result of the cut, device portion 470 and alignment tab 410 can be adjoined and integral on all three layers of protective film 420, overlay 430, and adhesive release liner 440, and can extend from first side 429 to second side 428. Construction of overlay applicator 400 also can include a die cut between alignment tab 410 and device portion 470 to create an interface slit 460. The die cut can be a kiss cut through adhesive release liner 440 and overlay 430, but not protective film 420. In a number of embodiments, alignment tab 410 can include a top layer that is integral with the protective film, a middle layer attached to the top layer, and/or a bottom layer attached to the middle layer. In some embodiments, overlay applicator 400 can include a cut between the middle layer of alignment tab 410 and overlay 530, and a cut between the bottom layer of alignment tab 410 and adhesive release liner 440. As a result of the kiss cut, the dimensions of device portion 470 at overlay 430 and adhesive release liner 440 can be equal to the dimensions of the screen of the device. The process of cutting the layers (protective film 420, overlay 430, and adhesive release liner 440) to size, cutting alignment mechanism 415, and other feature slots (e.g., speaker slot 423 and button slot 424), and kiss cutting to create interface slit 460 can advantageously provide a simpler method of constructing overlay applicator 400, and/or can provide overlay applicator 400 with a very accurate alignment of alignment mechanism 415 with respect to overlay 430 and its features.

In a number of embodiments, after kiss cutting alignment tab 410 and device portion 470 to size, pull tab 450 can be attached to adhesive release liner 440. Pull tab 450 can be substantially similar or identical to pull tab 150 (FIG. 1), and various components or constructions of pull tab 450 can be the same as various components of pull tab 150 (FIG. 1). Pull tab 450 can facilitate removal of adhesive release liner 440. Construction of overlay applicator 400 can include adhering pull tab 450 to adhesive release liner 440. Pull tab can include a first side 459 and a second side 458. Pull tab 450 can include an adhesive region 451 at or near first side 459. Adhesive release liner 440 can include an adhesive region 442 at device portion 470 next to interface slit 460. Adhesive region 451 can be adhered to adhesive region 442 to attach pull tab 450 to adhesive release liner 440. Pull tab 450 can include a wiper 457, which can remove dust from the screen of the device, and can be similar to wiper 157 (FIG. 1). Pull tab 450 can include a pulling aid 156 at or near second side 458, which can assist a user and/or an applicator machine in engaging with and pulling pull tab 450, as describe above in connection with pull tab 150 (FIG. 1). After pull tab 450 is attached to adhesive release liner 440, a user and/or machine can pull on pull tab 450 to peel back and remove adhesive release liner 440 starting at interface slit 460 and peeling back to first side 429.

Turning ahead in the drawings, FIG. 6 illustrates an isometric view of an overlay applicator 600. Overlay applicator 600 is merely exemplary and embodiments of the overlay applicator are not limited to embodiments presented herein. The overlay applicator can be employed in many different embodiments or examples not specifically depicted or described herein. Overlay applicator 600 can be similar to overlay applicator 100 (FIG. 1) and/or overlay applicator 400 (FIGS. 4-5), and various components and/or constructions of overlay applicator 600 can be substantially identical or similar to various components of overlay applicator 100 (FIG. 1) and/or overlay applicator 400 (FIGS. 4-5). Overlay applicator 600 can include a protective film 620, an overlay 630, an adhesive release liner 640, and/or a pull tab 650. Protective film 620 can be similar to protective film 120 (FIG. 1) and/or protective film 420 (FIGS. 4-5), overlay 630 can be similar to overlay 130 (FIG. 1) and/or overlay 430 (FIGS. 4-5), adhesive release liner 640 can be similar to adhesive release liner 140 (FIG. 1) and/or adhesive release liner 440 (FIGS. 4-5), and/or pull tab 650 can be similar to pull tab 150 (FIG. 1) and/or pull tab 450 (FIGS. 4-5).

In a number of embodiments, overlay applicator 600 can include a device portion 670 and an alignment tab 610. Alignment tab 610 can be similar to alignment tab 110 (FIG. 1) and/or alignment tab 410 (FIG. 4). Device portion 670 can be similar to device portion 470 (FIGS. 4-5). In some embodiments, device portion 670 and alignment tab 610 can be made of the layers used for protective film 620, overlay 630, and adhesive release liner 640. Alignment tab 610 can include an alignment mechanism 615, which can be similar to alignment mechanism 115 (FIG. 1) and/or alignment mechanism 415 (FIGS. 4-5), and which can facilitate aligning alignment tab 610, protective film 620, overlay 630, and adhesive release liner 640 with various features of the device during application of overlay 630. Pull tab 650 can be integral with release liner 640 and can be a single layer of material, such as plastic, paper, or another suitable liner film. Pull tab 450 can facilitate removal of adhesive release liner 440.

In many embodiments, construction of overlay applicator 600 can include adhering and/or attaching layers of material for protective film 620, overlay 630, and adhesive release liner 640. After attaching the layers, protective film 620 and overlay 630 can be kiss cut to predetermined dimensions of device portion 670 and alignment tab 610, without cutting adhesive release liner 640 and/or pull tab 650. Excess material from the layers for protective film 620 and overlay 630 can be removed. In some embodiments, the kiss cutting of device portion 670 and alignment tab 610 to size at the layers of protective film 620 and overlay 630 can include cutting a speaker slot 623, a button slot 624, and/or alignment mechanism 615. The kiss cutting can also include cutting an interface slit 660 between alignment tab 610 and device portion 670 through the layers of protective film 620 and overlay 630, but not adhesive release liner 640. As a result of the kiss cut, the dimensions of device portion 670 at overlay 630 and protective film 620 can be equal to the dimensions of the screen of the device. In many embodiments, alignment tab 610 can include a top layer and a bottom layer attached to the top layer, and overlay applicator 600 can include a cut between the top layer of alignment tab 610 and protective film 620, and a cut between the bottom layer of the alignment tab and overlay 630.

In a number of embodiments, after kiss cutting alignment tab 610 and device portion 670 to size at the layers of protective film 620 and overlay 630, and cutting interface slit 660, construction of overlay applicator 600 can include adhering a joining sticker 680 on the top the layer of protective film 620 to span interface slit 660 and join device portion 670 of protective film 620 with the top layer of alignment tab 610. Joining sticker 680 can help maintain alignment between alignment tab 610 and device portion 670. In many embodiments, joining sticker 680 does not stretch or distort, which can advantageously facilitate alignment of alignment mechanism 615 with overlay 630, such that overlay 630 can be accurately positioned on the screen of the device.

In a number of embodiments, after kiss cutting alignment tab 610 and device portion 670 to size, a wiper 657 can be attached to pull tab 650. Wiper 657 can remove dust from the screen of the device, and can be similar to wiper 157 (FIG. 1) and/or wiper 457 (FIGS. 4-5). In certain embodiments, after joining sticker 680 has been attached between alignment tab 610 and device portion 670, pull tab 650 can be folded back, such that a second side 658 is folded beneath release liner 640 to a first side 659. Pull tab 650 and release liner 640 can be peeled back off of a portion of alignment tab 610, such that alignment mechanism 615 is uncovered by release liner 640, allowing alignment mechanism to engage with an alignment base, such as alignment base 212 (FIG. 2) or alignment base 312 (FIG. 3). The process of kiss cutting the layers at protective film 620 and overlay 630 can advantageously provide a simpler method of constructing overlay applicator 600, and/or can provide overlay applicator 600 with a very accurate alignment of alignment mechanism 615 with respect to overlay 630 and its features.

Figure 7:
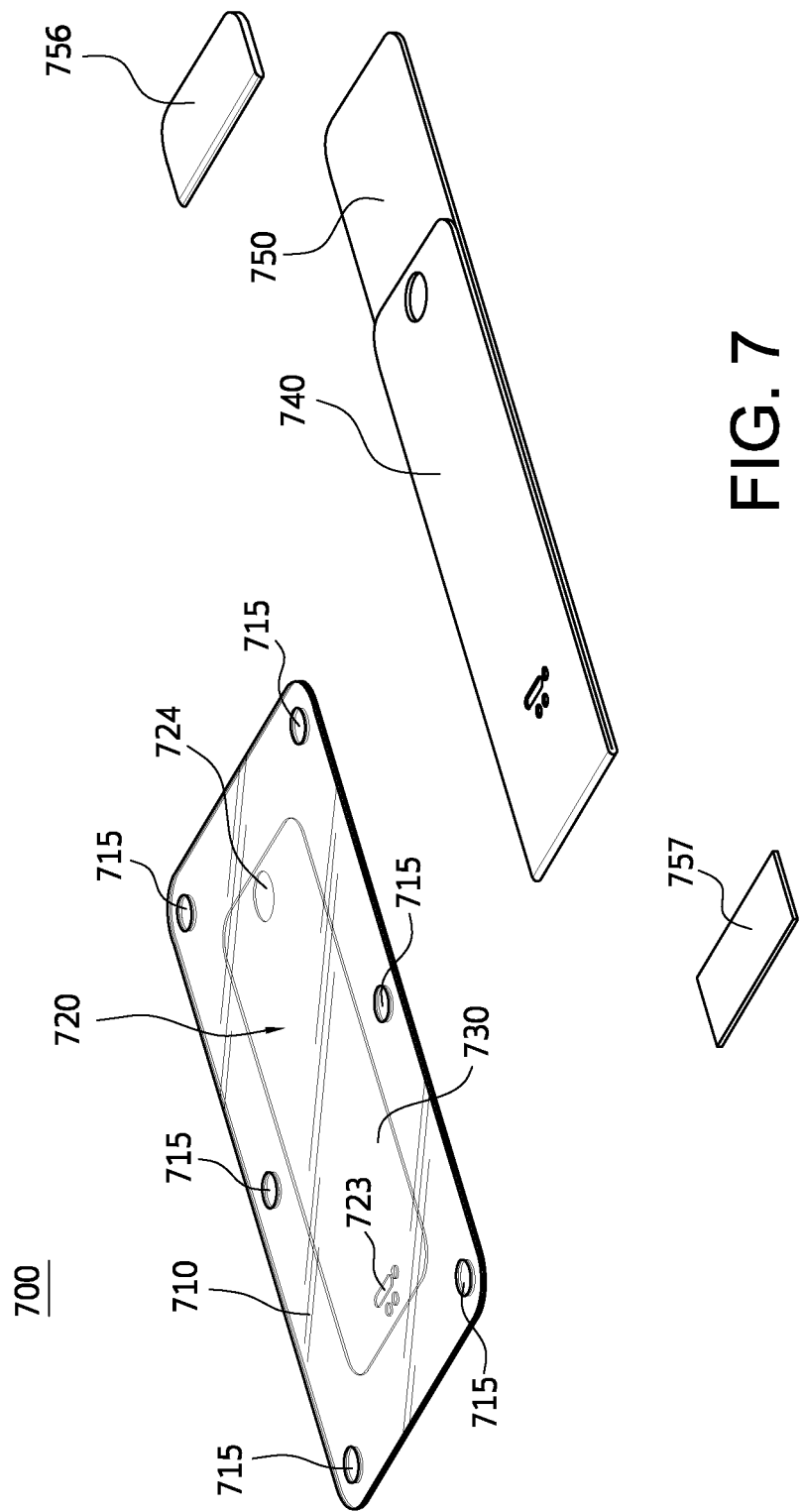
FIG. 7 illustrates an exploded isometric view of an overlay applicator, according to another embodiment.

Turning ahead in the drawings, FIG. 7 illustrates an exploded isometric view of an overlay applicator 700. Overlay applicator 700 is merely exemplary and embodiments of the overlay applicator are not limited to embodiments presented herein. The overlay applicator can be employed in many different embodiments or examples not specifically depicted or described herein. Overlay applicator 700 can be similar to overlay applicator 100 (FIG. 1), overlay applicator 400 (FIGS. 4-5), and/or overlay applicator 600 (FIG. 6), and various components and/or constructions of overlay applicator 700 can be substantially identical or similar to various components of overlay applicator 100 (FIG. 1), overlay applicator 400 (FIGS. 4-5), and/or overlay applicator 600 (FIG. 6). Overlay applicator 700 can include a protective film 720, an overlay 730, an adhesive release liner 740, and/or a pull tab 750. Protective film 720 can be similar to protective film 120 (FIG. 1), protective film 420 (FIGS. 4-5), and/or protective film 620 (FIG. 6); overlay 730 can be similar to overlay 130 (FIG. 1), overlay 430 (FIGS. 4-5), and/or overlay 630 (FIG. 6); adhesive release liner 740 can be similar to adhesive release liner 140 (FIG. 1), adhesive release liner 440 (FIGS. 4-5), and/or adhesive release liner 640 (FIG. 6); and/or pull tab 750 can be similar to pull tab 150 (FIG. 1), pull tab 450 (FIGS. 4-5), and/or pull tab 650 (FIG. 6).

In many embodiments, protective film 720 can include an alignment frame 710 extending around each side of overlay 730. Alignment frame 710 can be similar to alignment tab 110 (FIGS. 1-3), alignment tab 410 (FIGS. 4-5), and/or alignment tab 610 (FIG. 6). In many embodiments, alignment frame 710 can be integral with protective film 720. Alignment frame 710 can include an alignment mechanism 715. In some embodiments, alignment mechanism 715 can include multiple holes surrounding overlay 730. For example, as shown in FIG. 7, alignment mechanism 715 can include six holes spaced relatively evenly around alignment frame 710, surrounding overlay 730. In other embodiments, alignment mechanism 715 can include more or fewer holes than six. Alignment mechanism 715 can engage with an alignment base (e.g., similar to alignment base 212 (FIG. 2), and/or alignment base 312 (FIG. 3)). For example, overlay 700 can be used on a cradle, similar to cradle 310, which has alignment base pins configured to engage with alignment mechanism 715. Alignment frame 710 can provide alignment at multiple points around the overlay and the device, which can advantageously provide accurate alignment and help reduce distortion.

In some embodiments, construction of overlay applicator 700 can include adhering and/or attaching layers of material for protective film 720 and overlay 730. After attaching the layers of material for protective film 720 and overlay 730, constructing overlay applicator 700 can include cutting the layers for protective film 720 and overlay 730 to the appropriate dimensions of protective film 720. Such cutting can include cutting a button hole 724 and/or a speaker hole 723. Construction of overlay applicator 700 also can include kiss cutting through the layer of material for overlay 730 to cut overlay 730 to its appropriate dimension, i.e., to the size of the screen of the device. In many embodiments, the kiss cut through the layer of material for overlay 730 does not extend into protective film 720.

In a number of embodiments, after kiss cutting overlay 730, overlay 700 can be constructed by adhering adhesive release liner 740 and pull tab 750 to overlay 730. Pull tab 750 can be integral with release liner 740 and can be a single layer of material, such as plastic, paper, or another suitable liner film. Pull tab 750 can facilitate removal of adhesive release liner 740. Pull tab 750 can include a pulling aid 756, which can be a tab that allows a user and/or machine to pull on pull tab 750 and peel back adhesive release liner 740 from overlay 730. Pull tab 750 also can include a wiper 757. Wiper 757 can remove dust from the screen of the device, and can be similar to wiper 157 (FIG. 1), wiper 457 (FIG. 4-5), and/or wiper 657 (FIG. 6).

Figure 8:
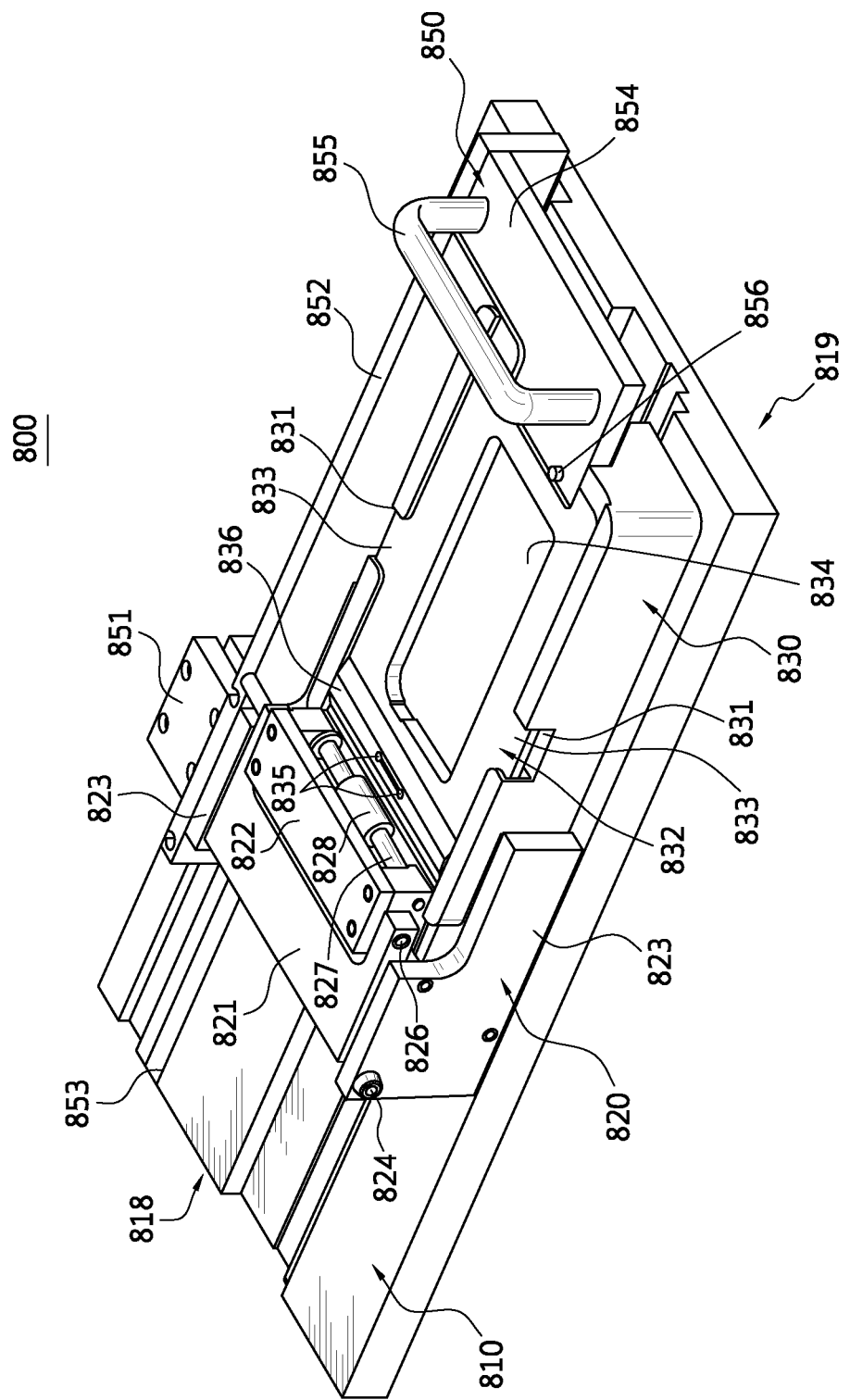
FIG. 8 illustrates an isometric view of a machine for using an overlay applicator to apply an overlay to a device, according to another embodiment.
Figure 9:
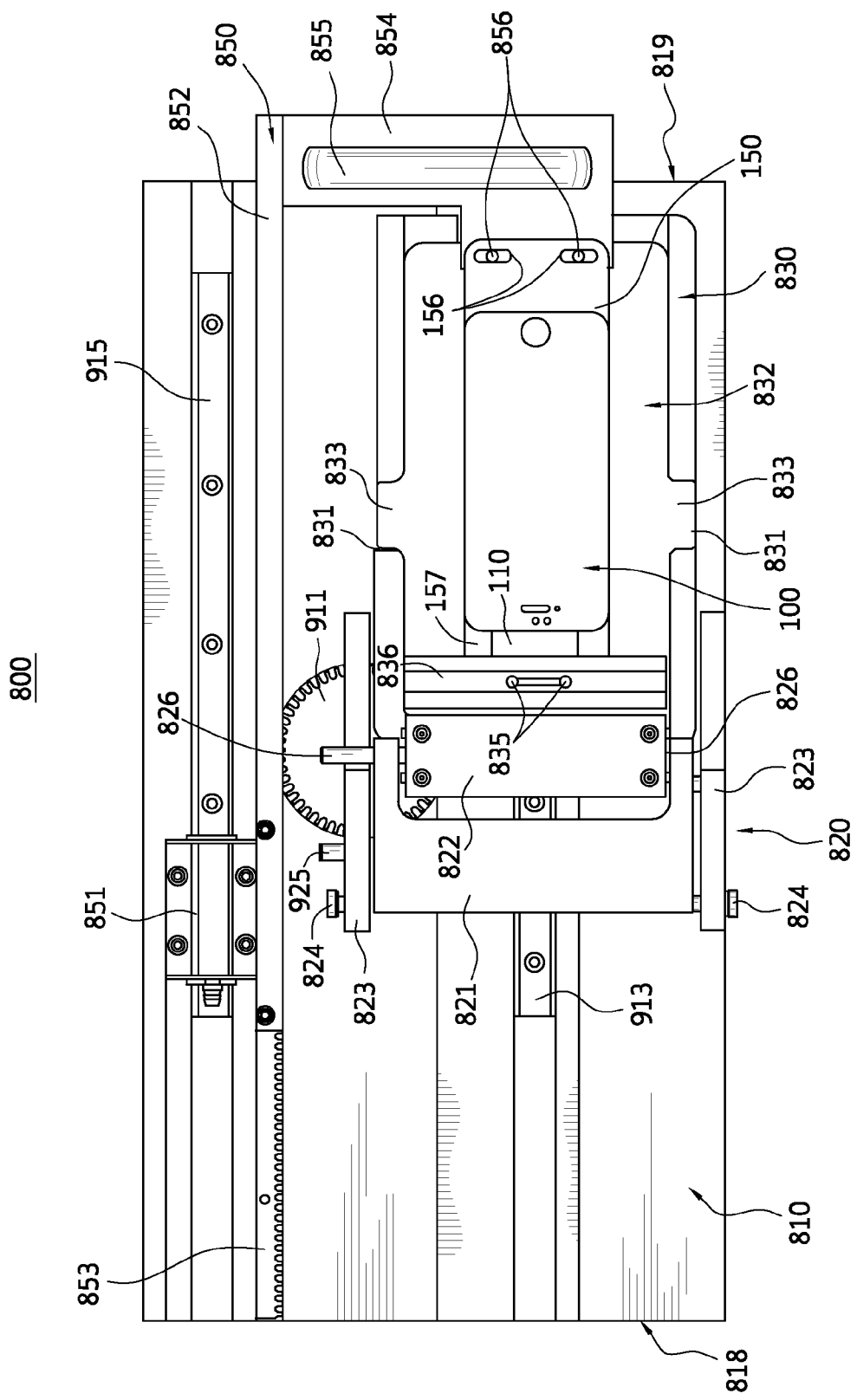
FIG. 9 illustrates a top view of the machine of FIG. 8.
Figure 10:
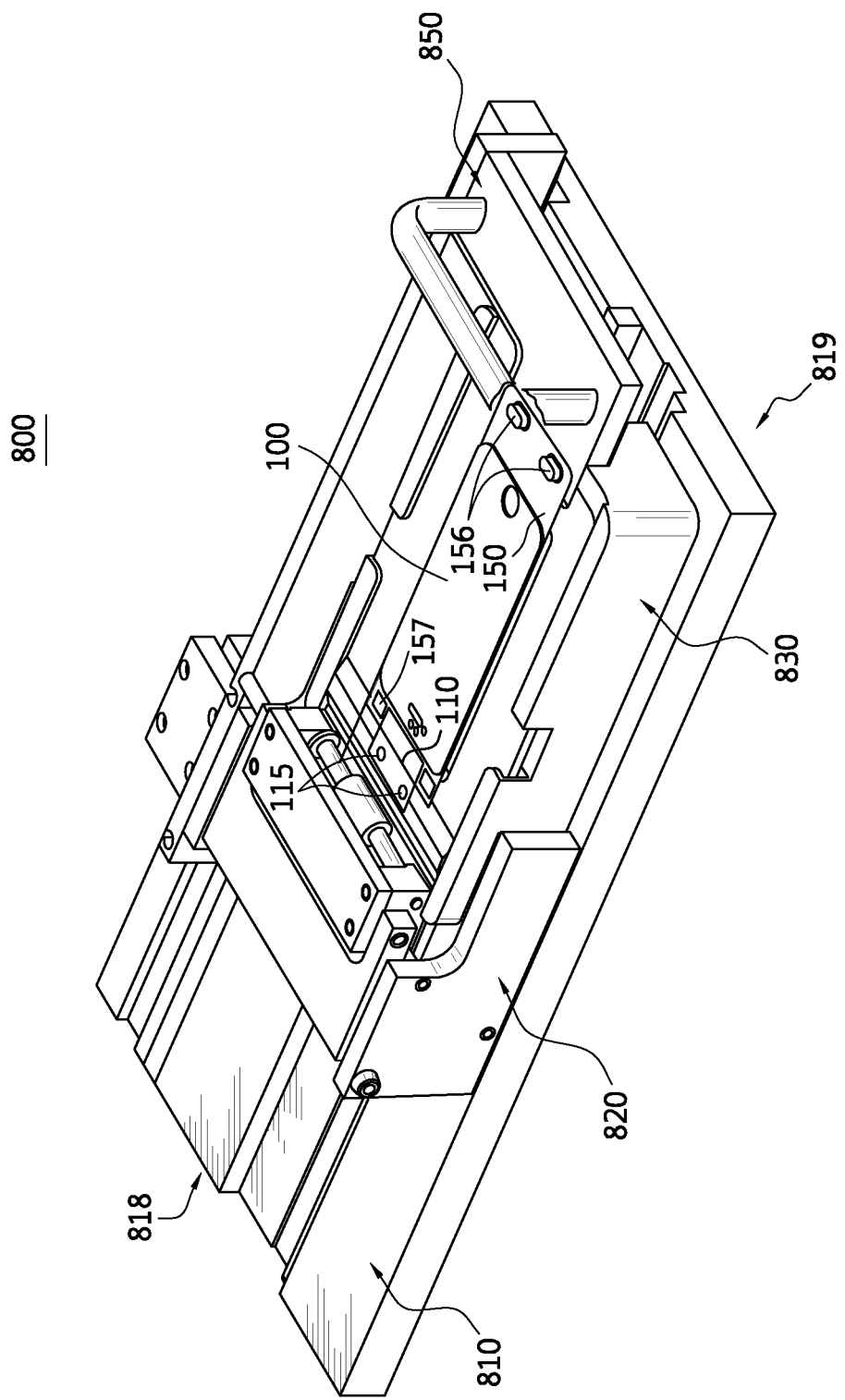
FIG. 10 illustrates an isometric view of the machine of FIG. 8, with a handle assembly not extended, and showing an outline of the overlay applicator of FIG. 1.
Figure 11:
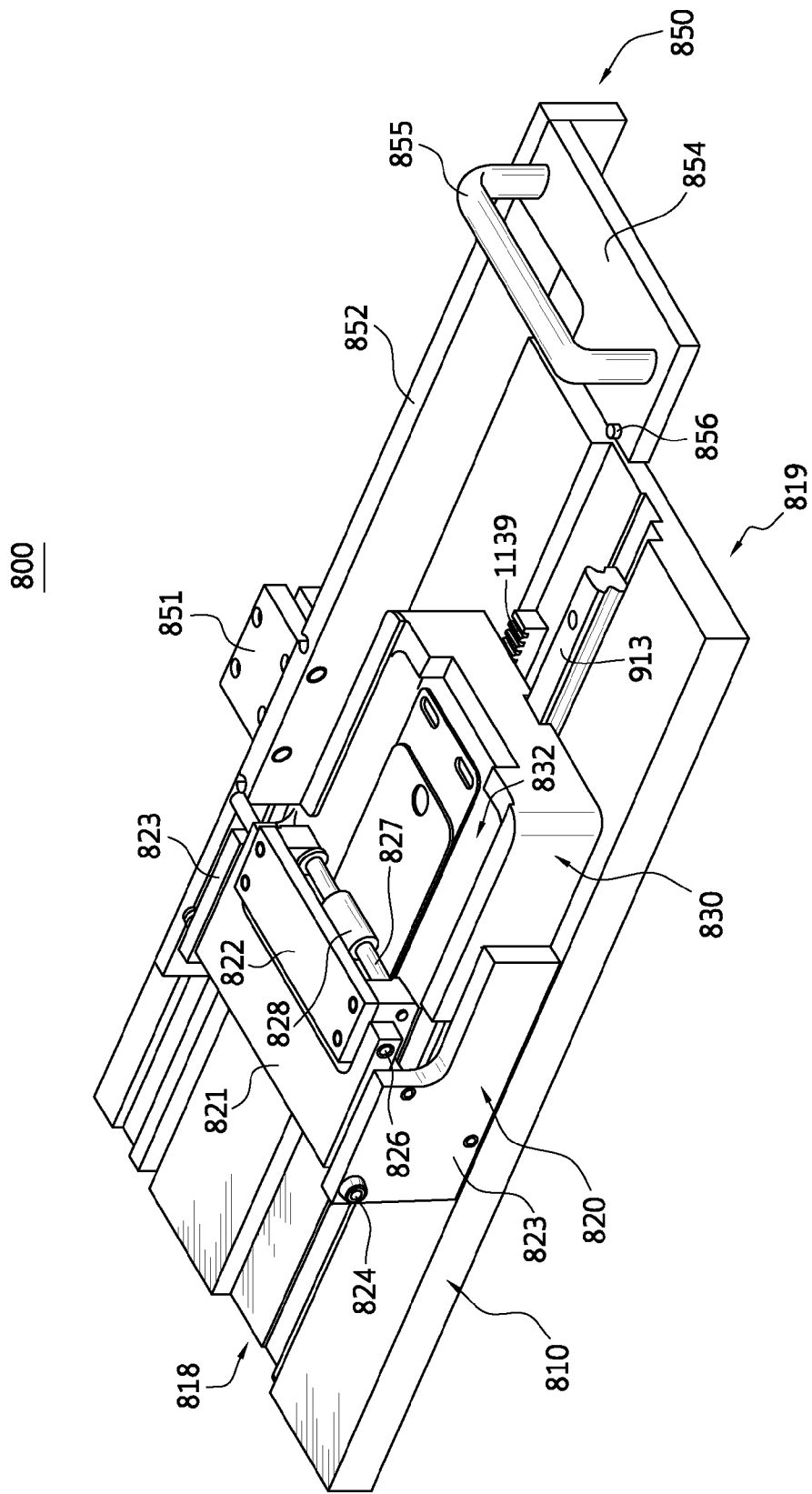
FIG. 11 illustrates an isometric view of the machine of FIG. 8, with the handle assembly partially extended.
Figure 12:
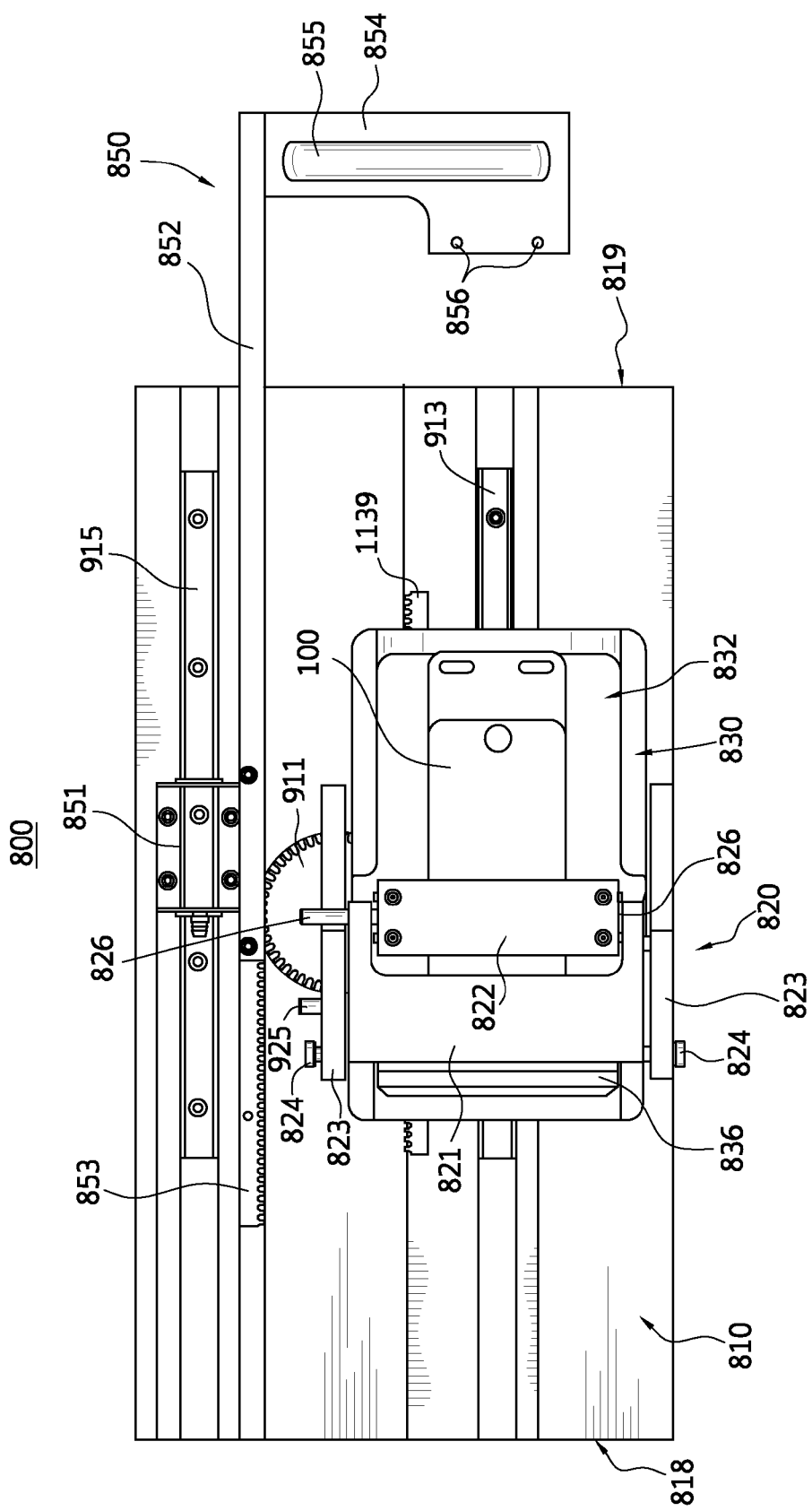
FIG. 12 illustrates a top view of the machine of FIG. 8, with the handle assembly partially extended.
Figure 13:
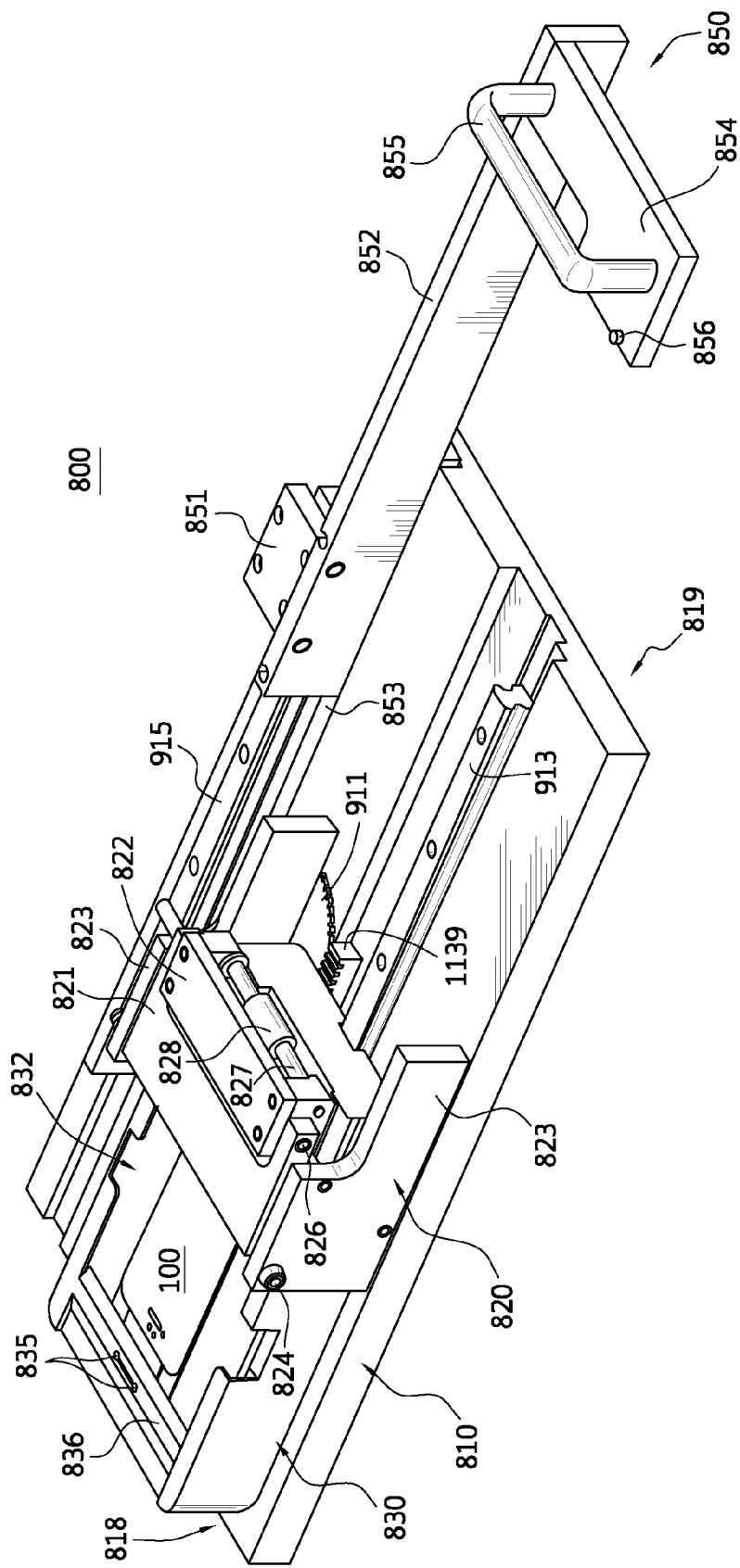
FIG. 13 illustrates an isometric view of the machine of FIG. 8, with the handle assembly fully extended.
Figure 14:
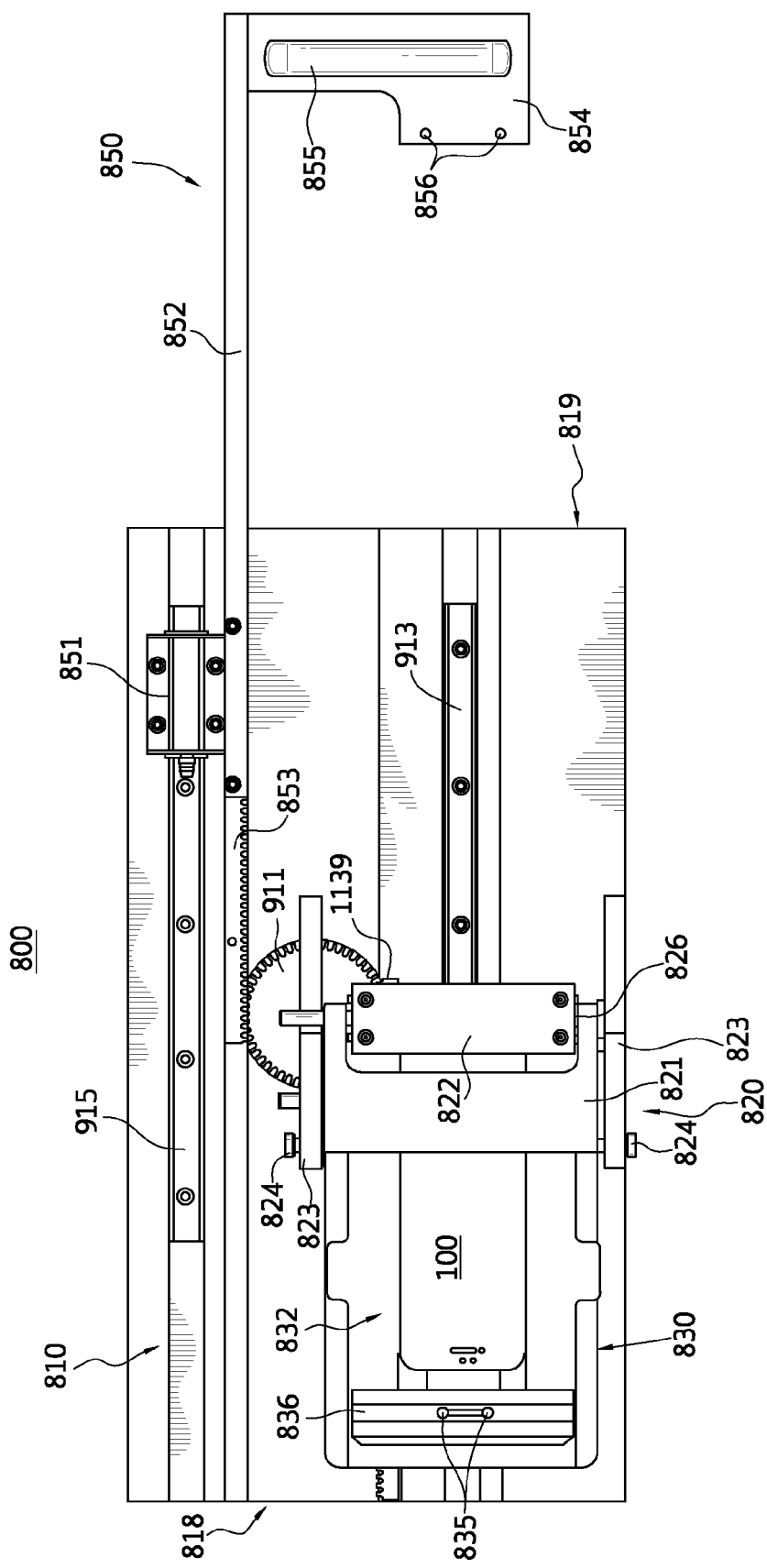
FIG. 14 illustrates a top view of the machine of FIG. 8, with the handle assembly fully extended.

Turning ahead in the drawings, FIG. 8 illustrates an isometric view of a machine 800 for using an overlay applicator to apply an overlay to a device. FIG. 9 illustrates a top view of machine 800. FIG. 10 illustrates an isometric view of machine 800, with a handle assembly not extended, and showing an outline of overlay applicator 100. FIG. 11 illustrates an isometric view of machine 800 with the handle assembly partially extended. FIG. 12 illustrates a top view of machine 800 with the handle assembly partially extended. FIG. 13 illustrates an isometric view of machine 800 with the handle assembly fully extended. FIG. 14 illustrates a top view of machine 800 with the handle assembly fully extended. Machine 800 is merely exemplary and embodiments of the machine are not limited to embodiments presented herein. The machine can be employed in many different embodiments or examples not specifically depicted or described herein. Machine 800 can be used with overlay applicator 100 to apply overlay 130 (not shown) to the device. Machine 800 also can be used with other overlay applicators (e.g., overlay applicator 400 (FIGS. 4-5), or overlay applicator 600 (FIG. 6)). In many embodiments, machine 800 can include a base 810, a carriage 830, and a handle assembly 850. In some embodiments, base 810 can extend from a first side 819 to a second side 818. Base 810 can include a gear 911 (FIGS. 9 and 12-14), a carriage rail 913 (FIGS. 9 and 11-14), and a handle rail 915 (FIGS. 9 and 12-14). Carriage rail 913 and handle rail 915 can extend partially or fully across base 810 in the direction from first side 819 to second side 818.

In certain embodiments, handle assembly 850 can include a handle sliding mechanism 851, which can engage with handle rail 915 to attach handle assembly 850 to base 810 and to allow handle assembly 850 to slide back and forth along base 810 along the direction of handle rail 915. In several embodiments, handle assembly 850 can include a handle extender 852 and a handle base 854. In some embodiments, handle extender 852 can extend parallel to handle rail 915 and handle base 854 can be substantially perpendicular to handle extender 852. Handle extender 852 can include handle gear teeth 853, which can engage with gear 911 of base 810. Handle base 854 can include a handle 855, which a user can use to pull handle assembly 850 and extend handle assembly 850 with respect to base 810. In several embodiments, handle base 854 can include a pulling mechanism 856. In certain embodiments, pulling mechanism 856 can be one or more knobs or pins, which can engage with pulling aid 156 of pull tab 150 on overlay applicator 100, as shown in FIG. 9.

In some embodiments, carriage 830 can include a carriage sliding mechanism (not shown), which can engage with carriage rail 913 to attach carriage 830 to base 810 and to allow carriage 830 to slide back and forth along base 810 along the direction of carriage rail 913. In many embodiments, carriage 830 can include carriage gear teeth 1139 (FIGS. 11-14), which can engage with gear 911 of base 810. In a number of embodiments, carriage 830 can include one or more carriage slots 831 and/or a cradle 832. In some embodiments, cradle 832 can include one or more cradle tabs 833 that can engage in carriage slots 831 to hold cradle 832 in position. In some embodiments, carriage 830 can be used with multiple different sizes of cradles, which can be used for different devices. Carriage slots 831 and cradle tabs 833 can advantageously allow carriage 830 to removably hold cradle 832, which can allow machine 800 to be used to apply overlays to multiple different types of devices. For example, carriage 830 can be configured to hold one or more additional cradles that are different than cradle 832. The one or more additional cradles can be configured to securely hold one or more devices having different dimensions than the device that fits in cradle 832. In some embodiments, cradle 832 can be integral with carriage 830. Cradle 832 can include a recess 834 in which a device can be placed with screen facing upwards. Recess 834 can have sides and a bottom, and cradle 832 can have a height greater than the height of the device. In many embodiments, recess 834 is conformal with the device.

In some embodiments, cradle 832 can include an alignment base 835, which can engage with alignment mechanism 115, as shown in FIG. 10. In the same or other embodiments, carriage 830 can include alignment base 835. In some embodiments, alignment base 835 can be one or more protrusions that can fit inside the one or more slots of alignment mechanism 115. Alignment base can be configured to engage with alignment mechanism 115. Alignment base 835 and alignment mechanism 115 can be configured and positioned such that when alignment mechanism 115 is engaged with alignment base 835, overlay 130 (FIG. 1) can be positioned directly above the screen of the device, and aligned such that overlay 130 (FIG. 1) will be adhered in an accurate position on the screen when adhesive release liner 140 (FIG. 1) is removed.

In many embodiments, cradle 832 can include an overlay cover 836. In some embodiments, overlay cover 836 can partially cover overlay applicator 100 and can hold overlay applicator 100 to cradle 832. As shown in FIGS. 8-9, overlay cover 836 can cover alignment mechanism 115 and hold overlay applicator 100 to alignment base 835 when alignment mechanism 115 is engaged with alignment base 835. In various embodiments, overlay cover 836 can be removably attached to carriage 830 and/or cradle 832. In other embodiments, overlay cover 836 can be hingedly attached to carriage 830 and/or cradle 832. In some embodiments, overlay cover 836 can snap onto cradle 832 and/or alignment base 835. In other embodiments, overlay cover 836 can be attached to cradle 832 through a spring hinge, which can allow overlay cover 836 to be removably placed over overlay applicator 100 and to hold overlay applicator 100 close to cradle 832, and/or to retain alignment mechanism 115 on alignment base 835. In some embodiments, overlay cover 836 can have a trapezoidal shape or curved shape, so as to allow one or more rollers (described below) to roll over overlay cover 836.

In many embodiments, the device can be placed in cradle 832, with the screen of the device facing up. Overlay applicator 100 can be placed on cradle 832, as described above, and as shown in FIG. 9, such that alignment mechanism 115 engages with alignment base 835. Overlay cover 836 can be placed over overlay applicator 100.

In many embodiments, when handle assembly 850 is not extended, as shown in FIGS. 8-10, carriage 830 can be located at a first side 819 of base 810. As a user pulls handle assembly 855 and extends handle assembly 855 with respect to base 810, as shown in FIGS. 11-14, handle gear teeth 853 move toward first side 819, which can result in gear 911 rotating clockwise, and can further result in carriage gear teeth 1139 and carriage 830 moving toward second side 818. As handle assembly 850 moves away from carriage 830, pulling mechanism 856 can pull on pull tab 150, which can pull wiper 157 across the screen of the device and remove dust or other particles from the screen of the device, and which can peel away adhesive release liner 140 (FIG. 1) to expose the adhesive agent on bottom side 132 (FIG. 1) to the screen of the device. In many embodiments, handle assembly 850 can be pulled in a direction from second side 818 to first side 819. For example, handle assembly 850 can be pulled from a first handle position, such as shown in FIGS. 8-10, to a second handle position, such as shown in FIGS. 13-14. In several embodiments, when handle assembly 850 is moved from the first handle position, such as shown in FIGS. 8-10, to the second handle position, such as shown in FIGS. 13-14, carriage 830 can move in a second direction from first side 819 to second side 818, which is opposite from the first direction of movement by handle assembly 850. For example, carriage 830 can move from a first carriage position, such as shown in FIGS. 8-10, to a second carriage position, such as shown in FIGS. 13-14. In a number of embodiments, machine 800 can be configured such that when alignment base 835 is engaged with alignment mechanism 115, pulling mechanism 856 is engaged with pull tab 150, cradle 832 is holding the device, and handle assembly 850 is pulled in the first direction from the first handle position to the second handle position, adhesive release liner 140 (FIG. 1) of overlay applicator 100 can be removed from overlay 130 (FIG. 1) starting at a leading edge of overlay 130 (FIG. 1) (e.g., proximate to alignment mechanism 115) and continuing to a trailing edge of overlay 130 (FIG. 1) to expose the adhesive agent of overlay 130 (FIG. 1) to the screen of the device.

In a number of embodiments, base 810 can include a roller assembly 820. In some embodiments, roller assembly 820 can include roller assembly supports 823, a first roller assembly 821, and/or a second roller assembly 822. Roller assembly supports 823 can be attached to base 810 and extend upward to provide support for first roller assembly 821 and/or second roller assembly 822. Roller assembly supports 823 can be configured such that carriage 830 can slide back and forth between roller assembly supports 823 and under first roller assembly 821 and/or second roller assembly 822. First roller assembly 821 can be attached to roller assembly supports 823 at axle 824. First roller assembly 821 can include a first roller axle 925 (FIGS. 9 and 12), which can have a first roller surface (not shown) with a width at least equal to the width of the device. In some embodiments, axle 824 can be spring-loaded to provide downward pressure for first roller axle 925 as it rolls over overlay applicator 100.

Second roller assembly 822 can be attached to first roller assembly 821 at axle 826. Second roller assembly 822 can include a second roller axle 827, which can have a second roller surface 828. The width of second roller surface 828 can be less than the width of the device. In some embodiments, axle 826 can be spring-loaded to provide downward pressure for second roller axle 827 as is rolls over overlay applicator 100. The width of second roller surface 828 can be less than the width of the first roller surface (not shown). In many embodiments, roller assembly 820 can include one or more rollers, such as first roller axle 925 and/or second roller axle 827. In some embodiments, the width of the second roller surface 828 can be half the width of the device, and second roller surface 828 can be centered over the device as carriage 830 moves through roller assembly 820 from first side 819 to second side 818. As carriage 830 moves from first side 819 to second side 818, and as release liner 140 (FIG. 1) is removed, second roller surface 828 can roll along the middle of the top surface of protective film 120 (FIG. 1) to adhere overlay 130 (FIG. 1) to the screen of the device. Second roller surface 828 can roll along over the top surface of protective film 120 before first roller surface (not shown) rolls over the top surface of protective film 120 (FIG. 1) when carriage 830 moves from a first carriage position, such as shown in FIGS. 8-10, to a second carriage position, such as shown in FIGS. 13-14. In some embodiments, when carriage 830 moves from the first carriage position to the second carriage position, the first roller surface (not shown) and second roller surface 828 can roll over and press downward on overlay applicator 100 to adhere the exposed adhesive agent of overlay 130 (FIG. 1) to the screen of the device. In various embodiments, when carriage 830 moves from the first carriage position to the second carriage position, one or more of the rollers, such as the first roller surface (not shown) and/or second roller surface 828 can roll fully over a length of the screen of the device. By rolling over protective film 120 (FIG. 1) with second roller surface 828 before rolling over protective film 120 (FIG. 1) (having the wider first roller surface (not shown)), roller assembly 820 can advantageously apply overlay 130 (FIG. 1) to the screen of the device with fewer air bubbles, as air bubbles in the middle can be initially pushed outward by second roller surface 828.

In many embodiments, as a user pulls handle 855 and pull tab 150 is pulled, adhesive release liner 140 (FIG. 1) is peeled back from bottom side 132 (FIG. 1) of overlay 130 (FIG. 1) at the same rate as cradle 832 rolls through roller assembly 820, which can advantageously adhere overlay 130 (FIG. 1) to the screen of the device very shortly after it is exposed from the peeling of adhesive release liner 140 (FIG. 1), which can keep dust from adhering to overlay 130 (FIG. 1). In many embodiments, carriage 830 can move away from handle 855 at twice the rate that carriage 830 moves through roller assembly 820, which can advantageously allow pull tab 150 and adhesive release liner 140 (FIG. 1) to be fully peeled from off of overlay 130 (FIG. 1).

After overlay 130 (FIG. 1) is adhered to the screen of the device, the user can smooth overlay 130 (FIG. 1) on the device to remove bubbles, if there are any, between overlay 130 (FIG. 1) and the screen of the device. Protective film 120 (FIG. 1) can be removed from overlay 130 (FIG. 1). In some embodiments, protective film 120 (FIG. 1) can be removed by lifting and/or pulling alignment tab 110. In many embodiments, protective film 120 (FIG. 1) is removed after smoothing out any bubbles, so that protective film 120 (FIG. 1) can prevent damage to overlay 130 (FIG. 1) from forceful pushing or rubbing involved in smoothing the bubbles, as explained above. The device can be removed from cradle 832 with overlay 130 (FIG. 1) installed.

In some embodiments, overlay cover 836 can have a dimension such that it can fully cover protective cover 120 (FIG. 1). Overlay cover 836 can hold overlay applicator 100 close and/or securely to alignment base 835 and/or the device, such that, as handle 855 is extended, as pulling mechanism 856 pulls pulling aid 156, and as wiper 157 is pulled across the device, wiper 157 is held close to the device to remove any dust or other particles from the device. In some embodiments, overlay cover 836 can be a slightly flexible material that is rigid enough to hold overlay applicator 100 close to the device, but is flexible enough to allow second roller surface 828 and/or first roller surface (not shown) to provide local downward pressure through overlay cover 836 to adhere overlay 130 (FIG. 1) to the device and facilitate removing any air bubbles. For example, overlay cover 836 can be a clear plastic material having a thickness of approximately 1 mm to approximately 2 mm. Clear plastic can advantageously allow the user to see through overlay cover 836 to ensure alignment and proper operation of machine 800.

In other embodiments, machine 800 does not include roller assembly 820, overlay cover 836 can have a dimension such that it can fully cover protective cover 120 (FIG. 1). Overlay cover 836 can be rigid, and can be hinged to cradle 832 and/or carriage 830. Overlay cover 836 can include a snap or other attachment mechanism on the side opposite the hinge, which can hold overlay cover 836 at a predetermined distance from the device screen and facilitate wiping of the device screen by wiper 157. In another embodiment, the hinge connecting overlay cover 836 to cradle 832 and/or carriage 830 can be spring-loaded to hold overlay cover 836 close to overlay applicator 100.

Figure 15:
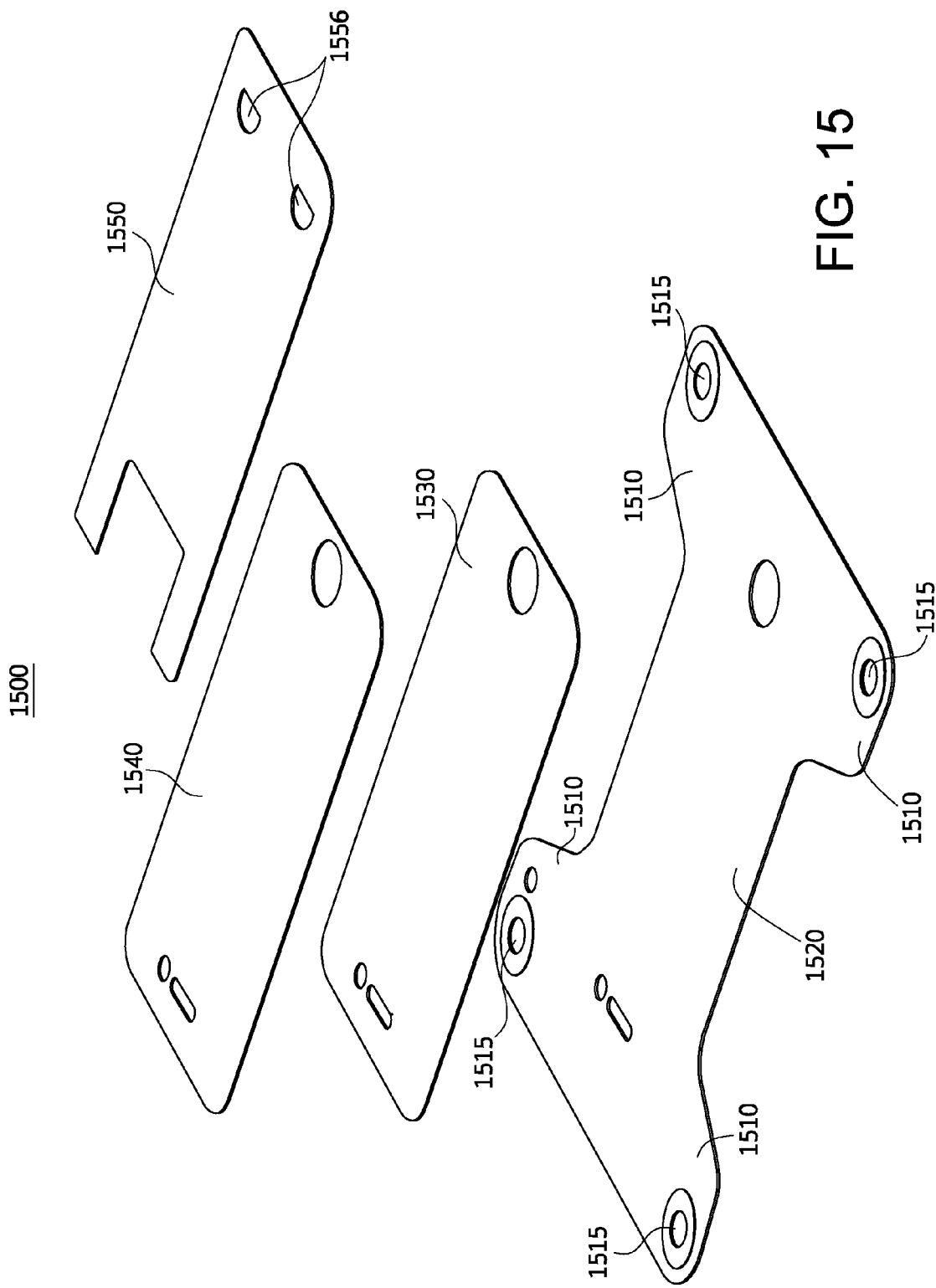
FIG. 15 illustrates an exploded isometric view of an overlay applicator, according to another embodiment.

Turning ahead in the drawings, FIG. 15 illustrates an exploded isometric view of an overlay applicator 1500. Overlay applicator 1500 is merely exemplary and embodiments of the overlay applicator are not limited to embodiments presented herein. The overlay applicator can be employed in many different embodiments or examples not specifically depicted or described herein. Overlay applicator 1500 can be similar to overlay applicator 100 (FIG. 1), overlay applicator 400 (FIGS. 4-5), overlay applicator 600 (FIG. 6), and/or overlay applicator 700 (FIG. 7), and various components and/or constructions of overlay applicator 1500 can be substantially identical or similar to various components of overlay applicator 100 (FIG. 1), overlay applicator 400 (FIGS. 4-5), overlay applicator 600 (FIG. 6), and/or overlay applicator 700 (FIG. 7). Overlay applicator 1500 can include a protective film 1520, an overlay 1530, an adhesive release liner 1540, and/or a pull tab 1550. Protective film 1520 can be similar to protective film 120 (FIG. 1), protective film 420 (FIGS. 4-5), protective film 620 (FIG. 6), and/or protective film 720 (FIG. 7); overlay 1530 can be similar to overlay 130 (FIG. 1), overlay 430 (FIGS. 4-5), overlay 630 (FIG. 6), and/or overlay 730 (FIG. 7); adhesive release liner 1540 can be similar to adhesive release liner 140 (FIG. 1), adhesive release liner 440 (FIGS. 4-5), adhesive release liner 640 (FIG. 6), and/or adhesive release liner 740 (FIG. 7); and/or pull tab 1550 can be similar to pull tab 150 (FIG. 1), pull tab 450 (FIGS. 4-5), pull tab 650 (FIG. 6), and/or pull tab 750 (FIG. 7). In some embodiments, protective film 1520, overlay 1530, and adhesive release liner 1540 can be attached to each other, and pull tab 1550 can be adhered to adhesive release liner 1540, similarly as shown above in FIG. 1, described above.

In many embodiments, protective film 1520 can include an alignment flaps 1510 extending at each corner of overlay 1530. Alignment flaps 1510 can be similar to alignment tab 110 (FIGS. 1-3), alignment tab 410 (FIGS. 4-5), alignment tab 610 (FIG. 6), and/or alignment frame 710 (FIG. 7). In a number of embodiments, alignment flaps 1510 can be integral with protective film 1520. Alignment flaps 1510 can include an alignment mechanism 1515. In some embodiments, alignment mechanism 1515 can include multiple holes surrounding overlay 1530. For example, as shown in FIG. 15, alignment mechanism 1515 can include a hole at each of alignment flaps 1510, at each corner surrounding overlay 1530. Alignment flaps 1510 can provide alignment at multiple points around overlay 1530, which can advantageously provide accurate alignment and help reduce distortion. In some embodiments, pull tab 1550 can include pulling aid 1556, which can be similar to pulling aid 156 (FIG. 1) and/or pulling aid 456 (FIGS. 4-5).

Figure 16:
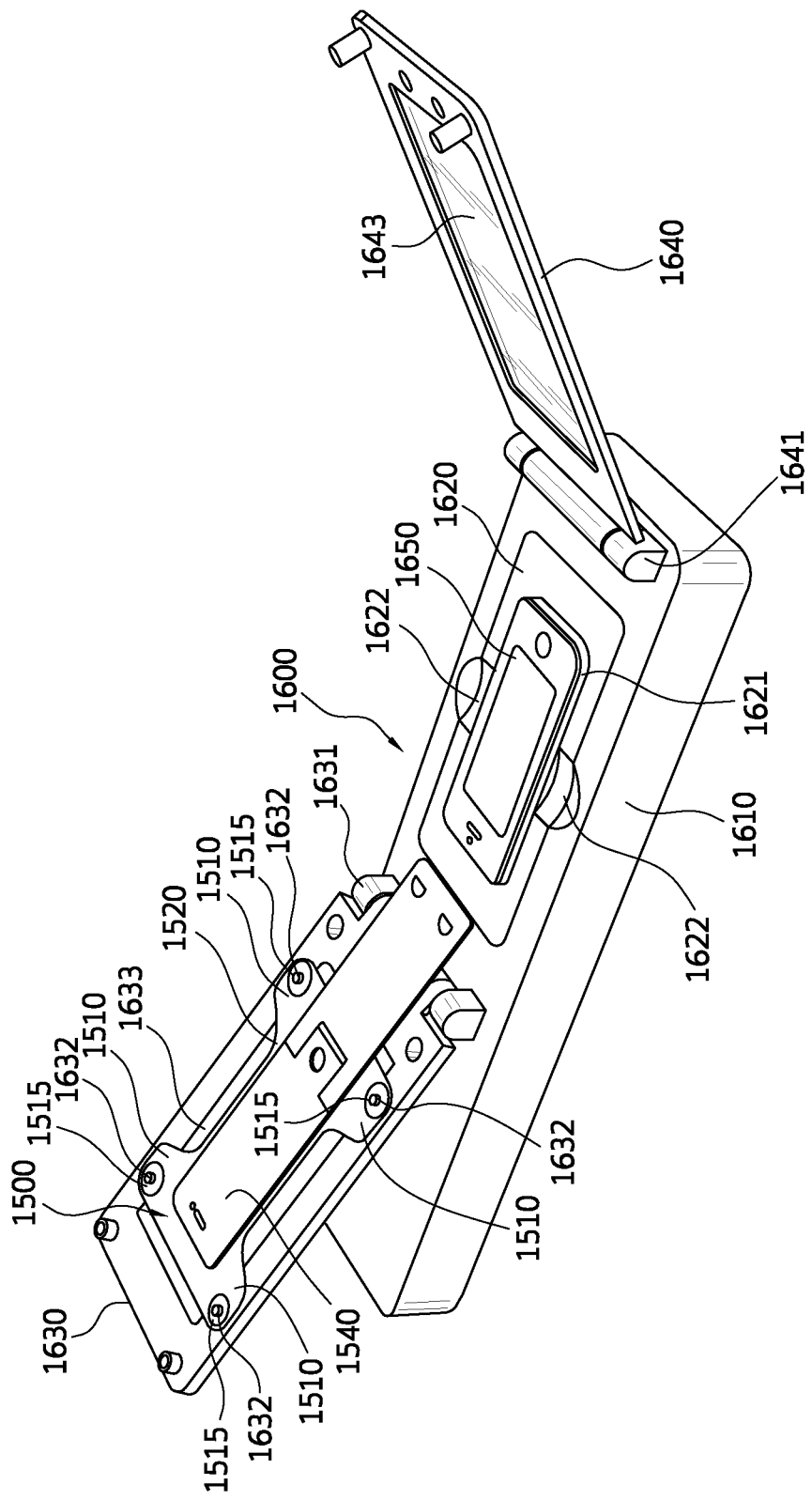
FIG. 16 illustrates an isometric view of an machine in a first configuration, according to another embodiment.
Figure 19:
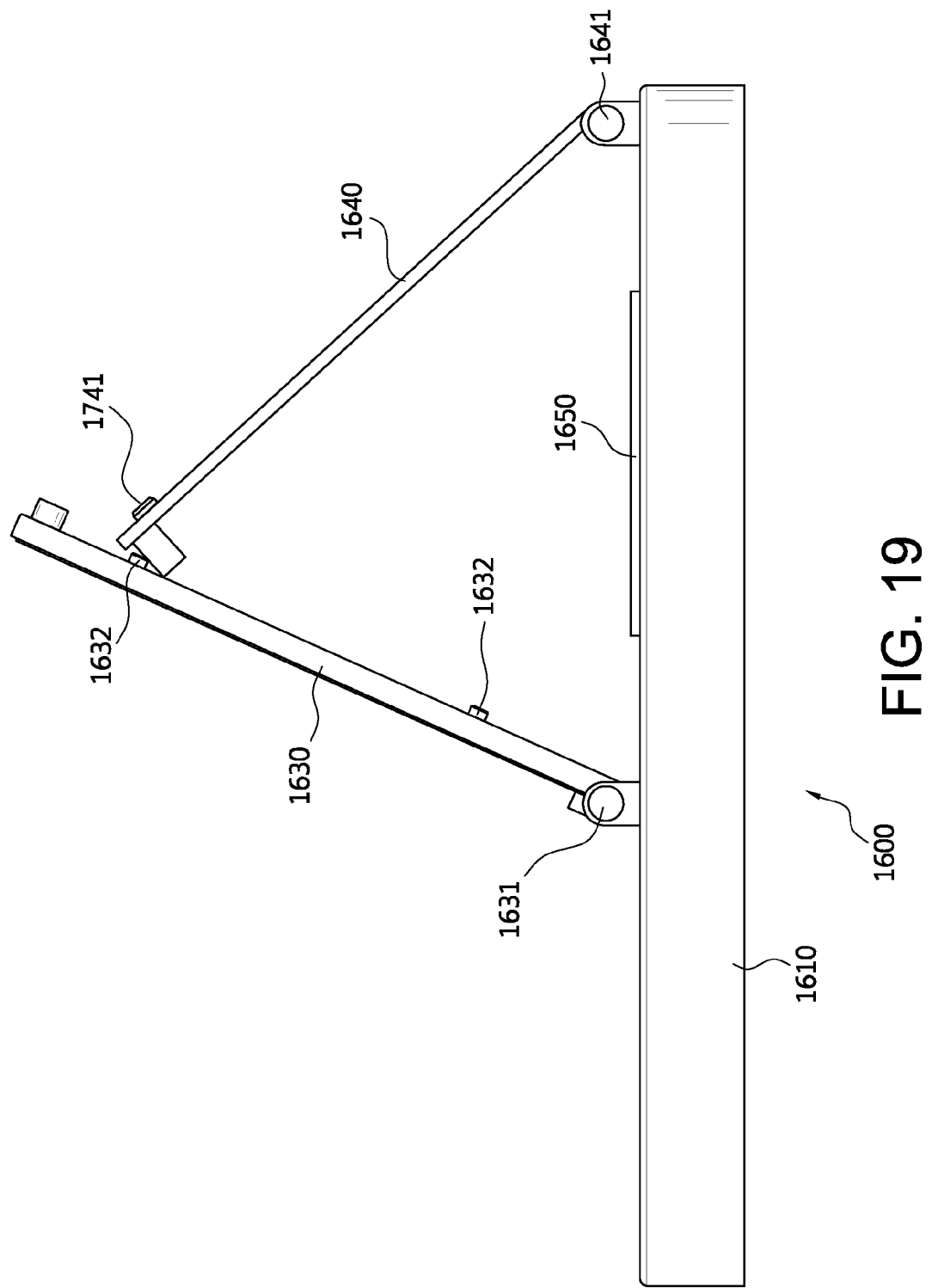
FIG. 19 illustrates a side view of the machine of FIG. 16 in a third configuration.

Turning ahead in the drawings, FIG. 16 illustrates an isometric view of an machine 1600 in a first configuration. FIG. 17 illustrates a top view of machine 1600 in a second configuration. FIG. 18 illustrates a side view of machine 1600 in a second configuration. FIG. 19 illustrates a side view of machine 1600 in a third configuration. Machine 1600 is merely exemplary and embodiments of the machine are not limited to embodiments presented herein. The machine can be employed in many different embodiments or examples not specifically depicted or described herein. In some embodiment, machine 1600 can include a base 1610, a cradle 1620, a first frame 1630, and/or a second frame 1640. In some embodiments first frame 1630 can be an alignment piece hingedly attached to base 1610. In a number of embodiments, second frame 1640 can be a pulling piece hingedly attached to base 1610. Cradle 1620 can include a slot 1621 in which a device 1650 (e.g., a smart phone) can be placed with the screen facing upwards. Cradle 1620 can also include recesses 1622 surrounding slot 1621 to allow a user to remove the device from cradle 1620. In some embodiments, slot 1621 is conformal with device 1650. In some embodiments, cradle 1620 can be integral with base 1610. In other embodiments, cradle 1620 can be removable from base 1610. For example, base 1610 can be configured to hold one or more additional cradles that are different than cradle 1620. The one or more additional cradles can be configured to securely hold one or more devices having different dimensions than the device that fits in cradle 1620.

In several embodiments, first frame 1630 can be attached to base 1610 at first hinge 1631, and can rotate around first hinge 1631. For example, first frame 1630 can be rotated relative to base 1610 in a first direction from a first position, such as shown in FIGS. 16-18, to a second position proximate to cradle 1620, such as shown in FIG. 19. In many embodiments, second frame 1640 can be attached to base 1610 at second hinge 1641, and can rotate around second hinge 1641. For example, second frame 1640 can be rotated relative to base 1610 in the first direction from a first position proximate to cradle 1620, such as shown in FIGS. 17-18, to a second position, such as shown in FIG. 16. First frame 1630 can include an alignment base 1632, which can engage with alignment mechanism 1515 to secure overlay applicator 1500 to first frame 1630. In certain embodiments, when machine 1600 is in a first configuration with cradle 1620 uncovered, as shown in FIG. 16, device 1650 can be placed in slot 1621, and overlay applicator 1500 can be attached to first frame 1630, with overlay applicator 1500 oriented with protective film 1520 facing first frame 1630 and adhesive release liner 1540 facing upward. In some embodiments, first frame 1630 can include an aperture or window 1633, and/or second frame 1640 can include an aperture or window 1643. Aperture or window 1633 and/or aperture or window 1643 can allow a user to reach through and/or see through first frame 1630 and second frame 1640.

When machine 1600 is in a second position with second frame 1640 covering cradle 1620, as shown in FIGS. 17-18, pull tab 1550 can be attached to second frame 1640 at the same time as overlay applicator 1500 is attached to first frame 1630. Second frame 1640 can include a pulling mechanism 1741, which can engage with pulling aid 1556 of pull tab 1550. Pulling mechanism 1741 can be a protrusion or other suitable attachment mechanism. In a number of embodiments, machine 1600 can be configured such that when alignment base 1632 is engaged with alignment mechanism (such as alignment flaps 1510), pulling mechanism 1741 is engaged with pull tab 1550, cradle 1620 is holding the device, and second frame 1640 is rotated relative to base 1610 in the first direction from the first position proximate, such as shown in FIGS. 17-18, to the second position, such as shown in FIG. 16, first frame 1630 can be rotated relative to base 1610 in the first direction from the first position, such as shown in FIGS. 16-18, to the second position, such as shown in FIG. 19, and adhesive release liner 1540 can be removed from overlay 1530 (FIG. 15) to expose the adhesive agent of overlay 1530 (FIG. 15) to the screen of the device.

To illustrate, for example, after pull tab 1550 is attached to second frame 1640, a user can lift second frame 1640, which can pull on pull tab 1550 and begin to peel adhesive release liner 1540 from overlay 1530 (FIG. 15). Raising second frame 1640 from base 1610 and pulling on pull tab 1550, can result in first frame 1630 being raised from base 1610, around first hinge 1631, as shown in FIG. 19. Continuing to rotate second frame 1640 around second hinge 1641 can result in adhesive release liner 1540 being peeling away from overlay 1530 (FIG. 15), exposing the adhesive agent on the bottom of overlay 1530 (FIG. 15). In many embodiments, second frame 1640 can be raised and rotated sufficiently around second hinge 1641 while pulling on pull tab 1550 and removing adhesive release liner 1540 to allow first frame 1630 to be further rotated around first hinge 1631 and lowered toward device 1650. When second frame 1640 has rotated fully around second hinge 1641, adhesive release liner 1540 can be completely removed from overlay 1530 (FIG. 15), and first frame can be lowered completely onto device 1650. After overlay 1530 (FIG. 15) is adhered to the screen of device 1650, the user can reach through aperture 1633 to smooth overlay 1530 (FIG. 15) on device 1650 to remove any bubbles between overlay 1530 (FIG. 15) and the screen of device 1650. First frame 1630 can be lifted and removed from protective film 1520. Protective film 1520 can be removed from overlay 1530 (FIG. 15). In some embodiments, protective film 1520 can be removed by lifting and/or pulling alignment flaps 1510. In many embodiments, protective film 1520 is removed after smoothing out any bubbles, so that protective film 1520 can prevent damage to overlay 1530 (FIG. 15) from forceful pushing or rubbing involved in smoothing the bubbles, as explained above. Device 1650 can be removed from cradle 1620 with overlay 1530 (FIG. 15) installed. In many embodiments, machine 1600 can be lightweight and easily portable, for example, such that it can be carried around by a sales associate.

Figure 20:
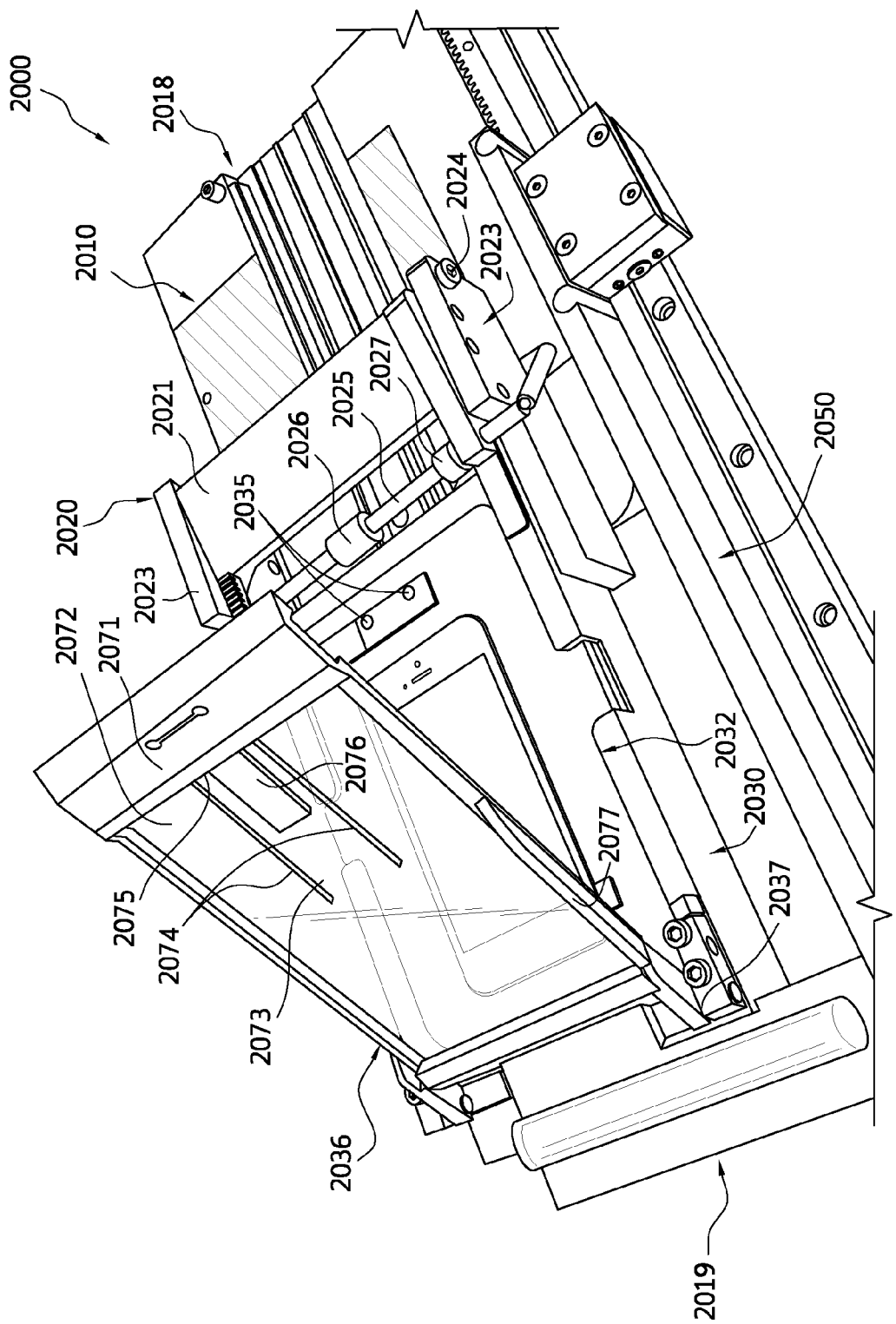
FIG. 20 illustrates an isometric view of a machine for using an overlay applicator to apply an overlay to a device, showing an overlay cover extended, according to another embodiment.
Figure 21:
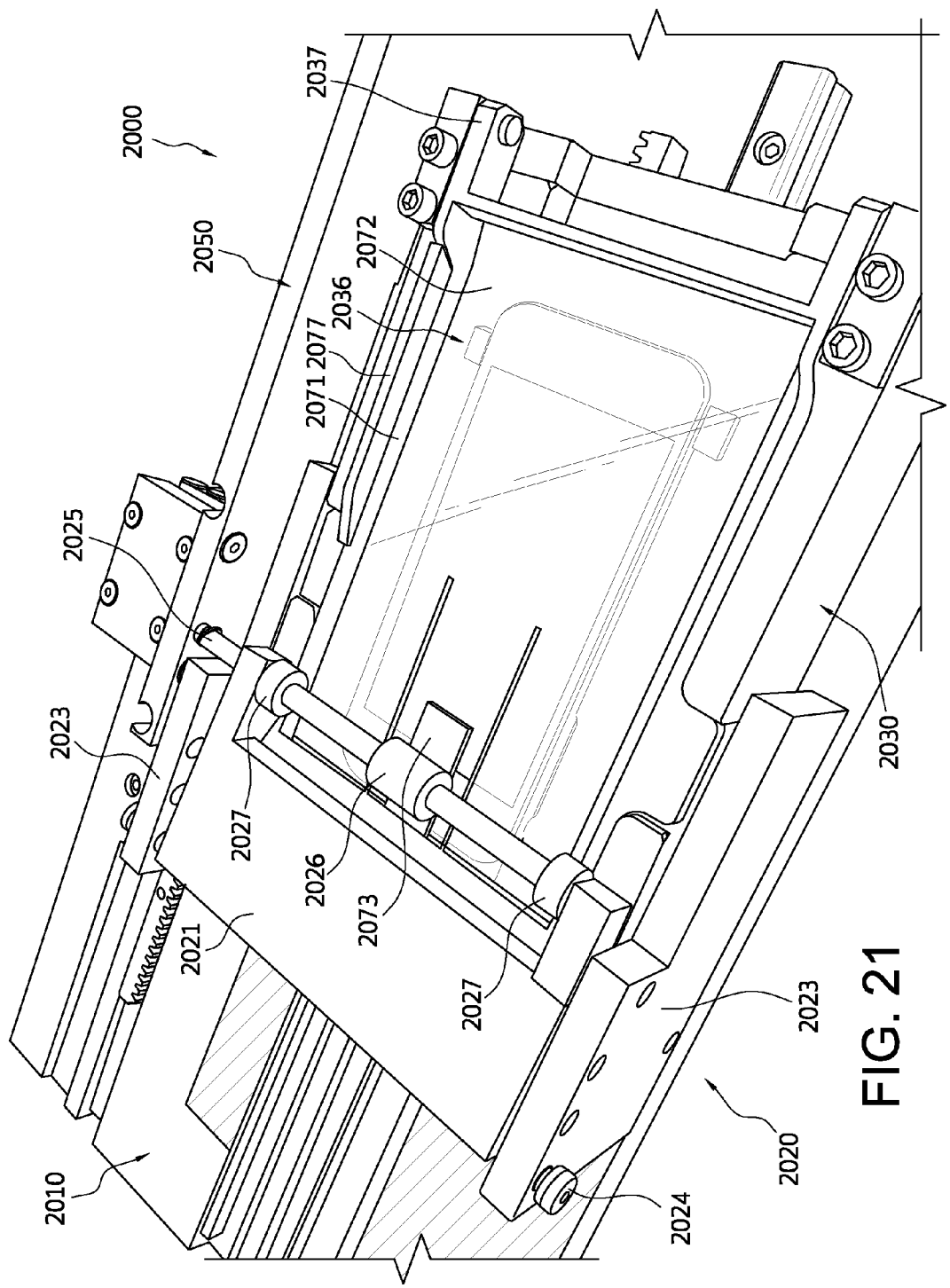
FIG. 21 illustrates an isometric view of the machine of FIG. 20 with the overlay cover engaged and the roller pressing against a tongue of the overlay cover.
Figure 22:
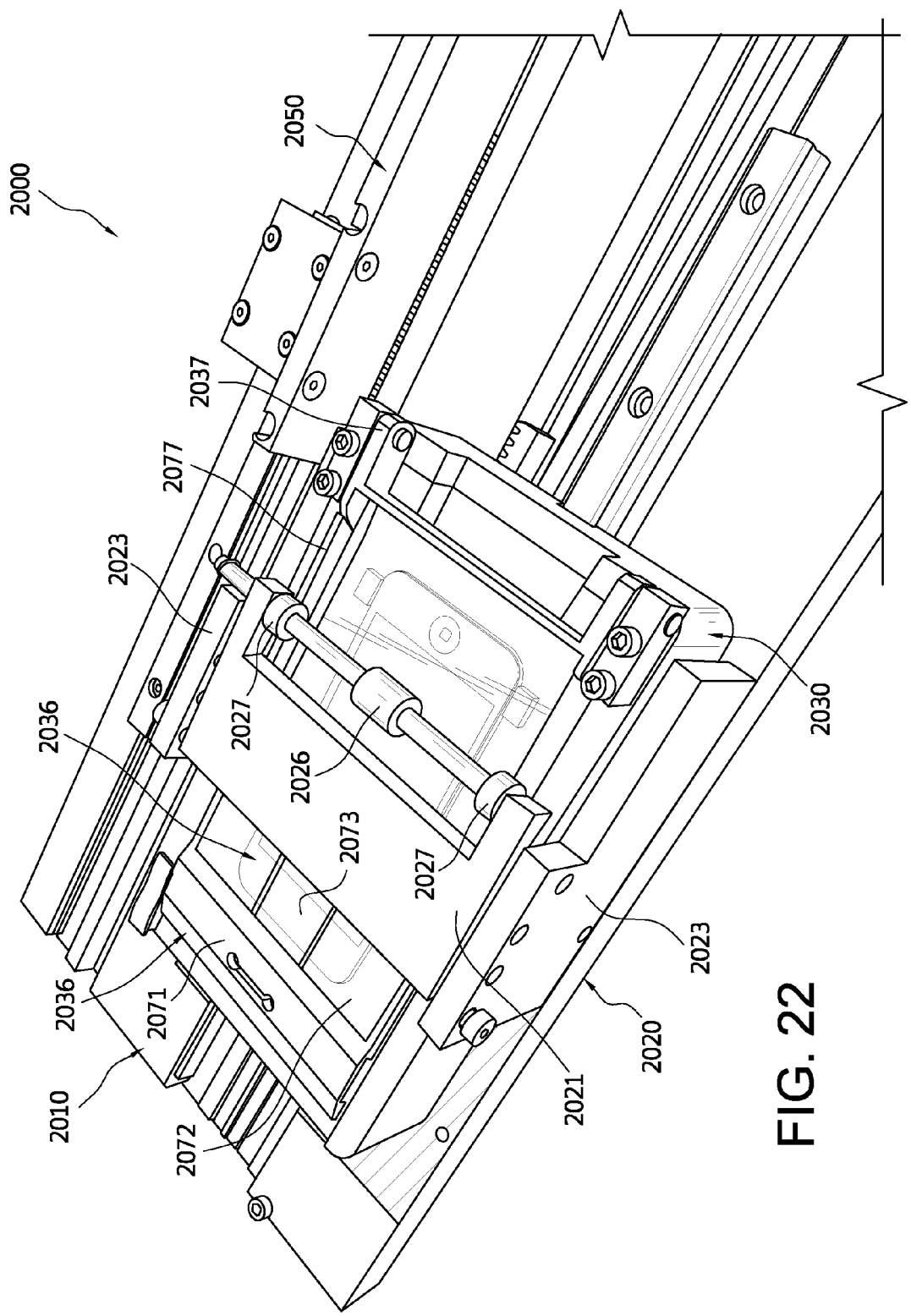
FIG. 22 illustrates an isometric view of the machine of FIG. 20 with the overlay cover engaged and the roller disengaged from the overlay cover.

Turning ahead in the drawings, FIG. 20 illustrates an isometric view of a machine 2000 for using an overlay applicator to apply an overlay to a device, showing the overlay cover extended. FIG. 21 illustrates an isometric view of machine 2000 with the overlay cover engaged and the roller pressing against the tongue of the overlay cover. FIG. 22 illustrates an isometric view of machine 2000 with the overlay cover engaged and the roller disengaged from the overlay cover. Machine 2000 is merely exemplary and embodiments of the machine are not limited to embodiments presented herein. The machine can be employed in many different embodiments or examples not specifically depicted or described herein. Machine 2000 can be used with an overlay applicator, such as overlay applicator 100 (FIG. 1), to apply an overlay, such as overlay 130 (FIG. 1), to the device. Machine 2000 also can be used with other overlay applicators (e.g., overlay applicator 400 (FIGS. 4-5), and/or overlay applicator 600 (FIG. 6). Machine 2000 can be similar to machine 800 (FIGS. 8-14) and various components or constructions of machine 2000 can be substantially identical or similar to various components of machine 800 (FIGS. 8-14), but can include variations in the roller assembly and the overlay cover. The operation of machine 2000 can be similar to the operation of machine 800 (FIGS. 8-14).

In many embodiments, machine 2000 can include a base 2010, a carriage 2030, and a handle assembly 2050, and can operate in a substantially similar manner to the operation of base 810, carriage 830 and handle assembly 850, respectively, of machine 800 (FIGS. 8-14). Base 2010 can extend from a first side 2019 to a second side 2018. Carriage 2030 can be configured to hold a cradle 2032, which can be substantially similar to cradle 832 (FIGS. 8-14). Carriage 2030 can be used with various different cradles, which can be configured for different devices. Cradle 2032 can include an alignment base 2035, which can engage with alignment mechanism 115 (FIG. 1).

Carriage 2030 can include an overlay cover 2036, which can cover overlay applicator 100 (FIG. 1) and can hold overlay applicator 100 (FIG. 1) to cradle 2032. In many embodiments, the device can be placed in cradle 2032, with the screen of the device facing up, as shown in FIGS. 20-22. Overlay applicator 100 (FIG. 1) can be placed on cradle 2032, such that alignment mechanism 115 (FIG. 1) engages with alignment base 2035. Overlay cover 2036 can be placed over overlay applicator 100. Overlay cover 2036 can be attached to carriage 2030 at an end of carriage 2030 closer to first end 2019, and/or can be attached with a hinge 2037. In other embodiments, overlay cover 2036 can be attached instead to cradle 2032. In many embodiments, hinge 2037 can be a spring-loaded hinge, which can bias overlay cover to cover overlay applicator 100 (FIG. 1). In other embodiments, overlay cover 2036 can include a snap or other attachment mechanism on the side opposite hinge 2037. Overlay cover 2036 can hold overlay applicator 100 (FIG. 1) within a predetermined distance from the device screen and can provide sufficient pressure to wiper 157 (FIG. 1) as it is pulled in order to clean the screen of the device.

Overlay cover 2036 can include a frame 2071 extending around a cover sheet 2072. Frame 2071 and/or cover sheet 2072 can be substantially rectangular. In many embodiments, cover sheet 2072 can be a piece of flexible or semi-flexible plastic. Cover sheet 2072 can be configured to press wiper 157 (FIG. 1) downward toward the screen of the device as wiper 157 (FIG. 1) moves across the screen of the device. In a number of embodiments, cover sheet 2072 can to secure overlay 130 (FIG. 1) proximate to the screen of the device. Cover sheet 2072 can be approximately 1.5 mm. In a number of embodiments, cover sheet 2072 can include a tongue 2073, which can be formed by two slits 2074 through the thickness of cover sheet 2072. In some embodiments, cover sheet 2072 can be attached to frame 2071 around the entire perimeter of frame 2071 except at a tongue interface 2075 in which tongue 2073 contacts frame 2071. Tongue 2073 can be centered between the sides of cover sheet 2072 and/or can extend through cover sheet 2072 from the side of opposite hinge 2037 partially toward of hinge 2037. Tongue 2073 can be configured to cover overlay applicator 100 (FIG. 1) proximate to the leading edge of overlay 130 (FIG. 3), near alignment mechanism 115 (FIG. 1). Tongue 2073 can include a central pad 2076. Central pad 2076 can be made of foam or an elastomeric material.

Base 2010 can include a roller assembly 2020. Roller assembly 2020 can be similar to roller assembly 820 (FIGS. 8-14). Roller assembly 2020 can include roller assembly supports 2023 and/or a roller cross support 2021. Roller assembly supports 2023 can be attached to base 2010 and extend upward to provide support for roller cross support 2021. Roller assembly supports 2023 can be configured such that carriage 2030 can slide back and forth between roller assembly supports 2023 and under roller cross support 2021. Roller cross support 2021 can be attached to roller assembly supports 2023 at axle 2024. Roller cross support 2021 can include a roller 2025, which can have a central roller surface 2026 with a width less than or equal to the width of tongue 2073 and can roll across the center between the two sides of overlay cover 2036. Roller 2025 can include one or more side rollers surfaces 2027, which can roll along the sides of frame 2071. In some embodiments, axle 2024 can be spring-loaded to provide downward pressure for roller 2025 as central roller surface 2026 rolls over overlay cover 2036.

In some embodiments, as handle assembly 2050 is extended and carriage 2030 moves from first side 2019 to second side 2018, central roller surface 2026 can roll along the central top side of overlay cover 2036. In many embodiments, as handle assembly 2050 is extended and pull tab 150 is pulled, wiper 157 (FIG. 1) is pulled away from the leading edge of overlay cover 2036 opposite hinge 2037, such that wiper 157 (FIG. 1) can be beyond the region near tongue interface 2075 when central roller surface 2026 first contacts tongue 2073 at tongue interface 2075. In many embodiments, as central roller surface 2026 rolls over tongue 2073, as shown in FIG. 21, it can provide sufficient pressure to depress tongue 2073 to adhere the exposed adhesive of overlay 130 (FIG. 1) to the surface of the device and push out air bubbles. Central pad 2076 can distribute the pressure to and provide a controlled pressure at the leading edge of overlay 130 (FIG. 1) near tongue interface 2075. By providing a solid adherence between overlay 130 (FIG. 1) and the screen of the device in the middle, the adhesive of overlay 130 (FIG. 1) can wet out to adhere toward the edges of overlay 130 (FIG. 1).

In many embodiments, one or both sides of frame 2071 can include a cam 2077. In some embodiments, cam 2077 can be configured to raise roller 2025, such as by side rollers 2027 rolling over the ramp and raised portions of cam 2077, so as to prevent central roller surface 2026 from pressing down on overlay cover 2036. In many embodiments, after central roller surface 2026 rolls over the length of tongue 2073, cam 2077 can raise roller 2025, which can disengage roller surface 2026 from overlay cover 2036 and allow machine 2000 to more easily pull away adhesive release liner 140 (FIG. 1) under the portion of overlay cover 2036 near hinge 2037, as shown in FIG. 22. Cam 2077 can be located proximate to the trailing edge of overlay 130 opposite from alignment mechanism 115 (FIG. 1).

Figure 23:
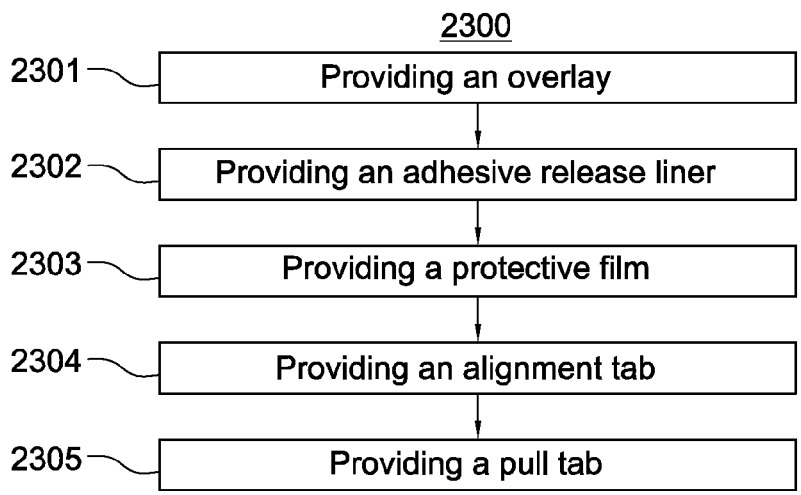
FIG. 23 illustrates a flow chart for a method of providing an overlay applicator, according to another embodiment.

Turning ahead in the drawings, FIG. 23 illustrates a flow chart for an embodiment of a method 2300 of providing an overlay applicator. Method 2300 is merely exemplary and is not limited to the embodiments presented herein. Method 2300 can be employed in many different embodiments or examples not specifically depicted or described herein. In some embodiments, the procedures, the processes, and/or the activities of method 2300 can be performed in the order presented. In other embodiments, the procedures, the processes, and/or the activities of the method 2300 can be performed in any other suitable order. In still other embodiments, one or more of the procedures, the processes, and/or the activities in method 2300 can be combined or skipped. In some embodiments, the overlay applicator can be similar or identical to overlay applicator 100 (FIG. 1), overlay applicator 400 (FIGS. 4-5), overlay applicator 600 (FIG. 6), overlay applicator 700 (FIG. 7), and/or overlay applicator 1500 (FIG. 15).

Referring to FIG. 23, method 2300 can include a block 2301 of providing an overlay. In many embodiments, the overlay can be similar or identical to overlay 130 (FIG. 1), overlay 430 (FIGS. 4-5), overlay 630 (FIG. 6), overlay 730 (FIG. 7), and/or overlay 1530 (FIG. 15). In a number of embodiments, the overlay can have a top side and a bottom side. The top side of the overlay can be similar or identical to top side 131 (FIG. 1) of overlay 130 (FIG. 1). The bottom side of the overlay can be similar or identical to bottom side 132 (FIG. 1) of overlay 130 (FIG. 1). In various embodiments, the bottom side can include an adhesive agent configured to adhere to a screen of an electronic device.

In some embodiments, method 2300 can include a block 2302 of providing an adhesive release liner. The adhesive release liner can be similar or identical to adhesive release liner 140 (FIG. 1), adhesive release liner 440 (FIGS. 4-5), adhesive release liner 640 (FIG. 6), adhesive release liner 740 (FIG. 7); and/or adhesive release liner 1540 (FIG. 15). In a number of embodiments, the adhesive release liner can have a top side and a bottom side. The top side of the adhesive release liner can be removably attached to the bottom side of the overlay. In some embodiments, the adhesive release liner can be configured to protect the adhesive agent at the bottom side of the overlay from contaminants.

In a number of embodiments, method 2300 can include a block 2303 of providing a protective film. In some embodiments, the protective film can be similar or identical to protective film 120 (FIG. 1), protective film 420 (FIGS. 4-5), protective film 620 (FIG. 6), protective film 720 (FIG. 7), and/or protective film 1520 (FIG. 15). In many embodiments, the protective film can be removably attached to the top side of the overlay.

In many embodiments, method 2300 can include a block 2304 of providing an alignment tab. In some embodiments, the alignment tab can be similar or identical to alignment tab 110 (FIG. 1), alignment tab 410 (FIGS. 4-5), alignment tab 610 (FIG. 6), alignment frame 710 (FIG. 7), and/or alignment flaps 1510 (FIG. 15). In many embodiments, the alignment tab can include an alignment mechanism. The alignment mechanism can be similar or identical to alignment mechanism 115 (FIG. 1), alignment mechanism 415 (FIG. 4), alignment mechanism 615 (FIG. 6), alignment mechanism 715 (FIG. 7), and/or alignment mechanism 1515 (FIG. 15). In various embodiments, the alignment mechanism of the alignment tab can be configured to engage with an alignment base, such as alignment base 212 (FIG. 2), alignment base 312 (FIG. 3), alignment base 835 (FIGS. 8-9, 13-14), alignment base 1632 (FIGS. 16-19), and/or alignment base 2035 (FIG. 20), to align the overlay with the screen of the electronic device.

In a number of embodiments, the alignment tab can include a top layer that is integral with the protective film, a middle layer attached to the top layer; and a bottom layer attached to the middle layer. In some embodiments, method 2300 of providing the overlay applicator can include providing a cut between the middle layer of the alignment tab and the overlay, and between the bottom layer of the alignment tab and the adhesive release liner.

In various embodiments, the alignment tab can include a top layer and a bottom layer attached to the top layer. In some embodiments, method 2300 of providing the overlay applicator can include providing a cut between the top layer of the alignment tab and the protective film, and between the bottom layer of the alignment tab and the overlay. In certain embodiments, method 2300 of providing the overlay applicator can include providing a sticker attached to and spanning the cut between the protective film and the top layer of the alignment tab.

In some embodiments, the alignment tab can include an alignment frame extending around each side of the overlay. In several embodiments, the alignment frame can be integral with the protective film. In a number of embodiments, the alignment frame can include the alignment mechanism. In various embodiments, the alignment mechanism can include at least six holes.

In a number of embodiments, the alignment tab can include alignment flaps extending at each corner of the overlay. In certain embodiments, the alignment flaps can be integral with the protective film. In various embodiments, the alignment flaps can include alignment mechanism.

In several embodiments, method 2300 can include a block 2305 of providing a pull tab. In some embodiments, the pull tab can be similar or identical to pull tab 150 (FIG. 1), pull tab 450 (FIGS. 4-5), pull tab 650 (FIG. 6), pull tab 750 (FIG. 7), and/or pull tab 1550 (FIG. 15). In many embodiments, the pull tab can include a wiper. The wiper can be similar or identical to wiper 157 (FIG. 1), wiper 457 (FIG. 4), wiper 657 (FIG. 6), and/or wiper 757 (FIG. 7). In certain embodiments, the pull tab can be integral with the adhesive release liner. In many embodiments, the pull tab, including the wiper, and the adhesive release liner can be configured such that the pull tab can be folded across the bottom side of the adhesive release liner and be pulled to remove the adhesive release liner from the bottom side of the overlay to expose the adhesive agent. In several embodiments, the pull tab, including the wiper, and the adhesive release liner can be configured such that when the pull tab is pulled, the wiper can be configured to wipe across and clean the screen of the electronic device. In several embodiments the pull tab, including the wiper, and the adhesive release liner can be configured such that when the pull tab is pulled, the wiper can be configured to wipe across a length of the screen of the electronic device that is greater than a width of the screen of the electronic device.

Figure 24:
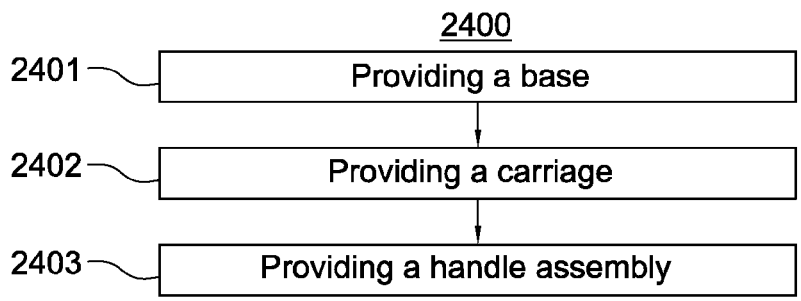
FIG. 24 illustrates a flow chart for a method of providing a machine, according to another embodiment.

Proceeding to the next drawing, FIG. 24 illustrates a flow chart for an embodiment of a method 2400 of providing a machine. Method 2400 is merely exemplary and is not limited to the embodiments presented herein. Method 2400 can be employed in many different embodiments or examples not specifically depicted or described herein. In some embodiments, the procedures, the processes, and/or the activities of method 2400 can be performed in the order presented. In other embodiments, the procedures, the processes, and/or the activities of the method 2400 can be performed in any other suitable order. In still other embodiments, one or more of the procedures, the processes, and/or the activities in method 2400 can be combined or skipped. In some embodiments, the machine can be similar or identical to machine 800 (FIGS. 8-14) and/or machine 2000 (FIGS. 20-22).

Referring to FIG. 24, method 2400 can include a block 2401 of providing a base. In many embodiments, the base can be similar or identical to base 810 (FIGS. 8-14) and/or base 2010 (FIGS. 20-22). In various embodiments, the base can include a roller assembly. The roller assembly can be similar or identical to roller assembly 820 (FIGS. 8-14) and or roller assembly 2020 (FIGS. 20-22). The roller assembly can include one or more rollers, such as the first roller surface or second roller surface 828 (FIGS. 8, 11, 13), central roller surface 2026 (FIGS. 20-22), and/or side roller surfaces 2027 (FIGS. 20-22).

In some embodiments, method 2400 can include a block 2402 of providing a carriage. The carriage can be similar or identical to carriage 830 (FIGS. 8-14) and/or carriage 2030 (FIGS. 20-22). In a number of embodiments, the carriage can include a first cradle. The first cradle can be similar or identical to cradle 832 (FIGS. 8-9, 12-14) and/or cradle 2032 (FIG. 20). The first cradle can be configured to securely hold a first electronic device. In many embodiments, the carriage can include an alignment base. The alignment base can be similar or identical to alignment base 212 (FIG. 2), alignment base 312 (FIG. 3), alignment base 835 (FIGS. 8-9, 13-14), alignment base 1632 (FIGS. 16-19), and/or alignment base 2035 (FIG. 20). The alignment base can be configured to engage with an alignment mechanism, such as alignment mechanism 115 (FIG. 1), alignment mechanism 415 (FIG. 4), alignment mechanism 615 (FIG. 6), alignment mechanism 715 (FIG. 7), and/or alignment mechanism 1515 (FIG. 15), of an overlay applicator, such as overlay applicator 100 (FIG. 1), overlay applicator 400 (FIGS. 4-5), overlay applicator 600 (FIG. 6), overlay applicator 700 (FIG. 7), and/or overlay applicator 1500 (FIG. 15).

In a number of embodiments, method 2400 can include a block 2403 of providing a handle assembly. The handle assembly can be similar or identical to handle assembly 850 (FIGS. 8-14) and/or handle assembly 2050 (FIGS. 20-22). In some embodiments, the handle assembly can include a handle. The handle can be similar or identical to handle 855 (FIGS. 8-9, 11-14). In several embodiments, the handle assembly can include a pulling mechanism. The pulling mechanism can be similar or identical to pulling mechanism 856 (FIGS. 8-9, 11-14) and/or pulling mechanism 1741 (FIGS. 17, 19). In a number of embodiments, the pulling mechanism can be configured to engage with a pull tab, such as pull tab 150 (FIG. 1), pull tab 450 (FIGS. 4-5), pull tab 650 (FIG. 6), pull tab 750 (FIG. 7), and/or pull tab 1550 (FIG. 15), of the overlay applicator.

In many embodiments, the machine can be configured such that the handle assembly can be pulled in a first direction relative to the base from a first handle position to a second handle position. In many embodiments, the machine can be configured such that when the handle assembly is moved from the first handle position to the second handle position, the carriage can move in a second direction relative to the base from a first carriage position to a second carriage position. The second direction can be opposite the first direction. In several embodiments, the machine can be configured such that when the alignment base is engaged with the alignment mechanism of the overlay applicator, the pulling mechanism is engaged with the pull tab of the overlay applicator, the first cradle is holding the first electronic device, and the handle assembly is pulled in the first direction relative to the base from the first handle position to the second handle position, an adhesive release liner of the overlay applicator can be removed from an overlay of the overlay applicator starting at a leading edge of the overlay and continuing to a trailing edge of the overlay to expose an adhesive agent of the overlay of the overlay applicator to a screen of the first electronic device.

In some embodiments, the machine can be configured such that when the carriage moves from the first carriage position to the second carriage position, the one or more rollers can be configured to roll over and press downward on the overlay applicator to adhere the exposed adhesive agent of the overlay to the screen of the first electronic device. In a number of embodiments, method 2400 can include providing an overlay cover. The overlay cover can be similar or identical to overlay cover 836 (FIGS. 8-9, 12-14) and/or overlay cover 2036 (FIGS. 20-22). In various embodiments, the overlay cover can be configured to secure the overlay applicator to the alignment base when the alignment mechanism of the overlay applicator is engaged with the alignment base.

Figure 25:
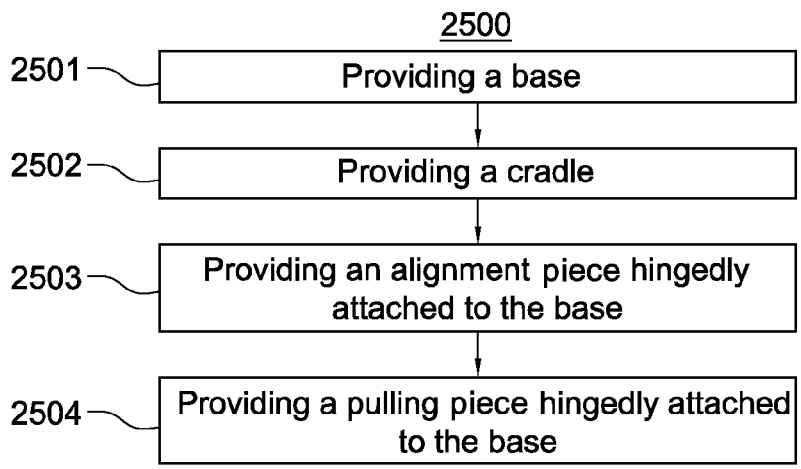
FIG. 25 illustrates a flow chart for a method of providing a machine, according to another embodiment.

Proceeding to the next drawing, FIG. 25 illustrates a flow chart for an embodiment of a method 2500 of providing a machine. Method 2500 is merely exemplary and is not limited to the embodiments presented herein. Method 2500 can be employed in many different embodiments or examples not specifically depicted or described herein. In some embodiments, the procedures, the processes, and/or the activities of method 2500 can be performed in the order presented. In other embodiments, the procedures, the processes, and/or the activities of the method 2500 can be performed in any other suitable order. In still other embodiments, one or more of the procedures, the processes, and/or the activities in method 2500 can be combined or skipped. In some embodiments, the machine can be similar or identical to machine 1600 (FIGS. 16-19).

Referring to FIG. 25, method 2500 can include a block 2501 of providing a base. In many embodiments, the base can be similar or identical to base 1610 (FIGS. 16-19).

In some embodiments, method 2500 can include a block 2502 of providing a cradle. The cradle can be similar or identical to cradle 1620 (FIG. 16). The cradle can be configured to securely hold a first electronic device.

In a number of embodiments, method 2500 can include a block 2503 of providing an alignment piece. The alignment piece can be similar or identical to first frame 1630 (FIGS. 16-19). In many embodiments, the alignment piece can be hingedly attached to the base. In several embodiments, the alignment piece can include an alignment base. The alignment base can be similar or identical to alignment base 212 (FIG. 2), alignment base 312 (FIG. 3), alignment base 835 (FIGS. 8-9, 13-14), alignment base 1632 (FIGS. 16-19), and/or alignment base 2035 (FIG. 20). The alignment base can be configured to engage with an alignment mechanism, such as alignment mechanism 115 (FIG. 1), alignment mechanism 415 (FIG. 4), alignment mechanism 615 (FIG. 6), alignment mechanism 715 (FIG. 7), and/or alignment mechanism 1515 (FIG. 15), of an overlay applicator, such as overlay applicator 100 (FIG. 1), overlay applicator 400 (FIGS. 4-5), overlay applicator 600 (FIG. 6), overlay applicator 700 (FIG. 7), and/or overlay applicator 1500 (FIG. 15).

In a number of embodiments, method 2500 can include a block 2504 of providing a pulling piece. The puling piece can be similar or identical to second frame 1640 (FIGS. 16-19). In many embodiments, the pulling piece can be hingedly attached to the base. In several embodiments, the pulling piece can include a pulling mechanism. The pulling mechanism can be similar or identical to pulling mechanism 856 (FIGS. 8-9, 11-14) and/or pulling mechanism 1741 (FIGS. 17, 19). In a number of embodiments, the pulling mechanism can be configured to engage with a pull tab, such as pull tab 150 (FIG. 1), pull tab 450 (FIGS. 4-5), pull tab 650 (FIG. 6), pull tab 750 (FIG. 7), and/or pull tab 1550 (FIG. 15), of the overlay applicator.

In some embodiments, the machine can be configured such that the pulling piece can be rotated relative to the base in a first direction from a first pulling piece position to a second pulling piece position. The first pulling piece position can be proximate to the cradle. In many embodiments, the machine can be configured such that the alignment piece can be rotated relative to the base in the first direction from a first alignment piece position to a second alignment piece position. The second alignment piece position can be proximate to the cradle. In many embodiments, the machine can be configured such that when the alignment base is engaged with the alignment mechanism of the overlay applicator, the pulling mechanism is engaged with the pull tab of the overlay applicator, the cradle is holding the first electronic device, and the pulling piece is rotated relative to the base in the first direction from the first pulling piece position to the second pulling piece position, the alignment piece can be rotated relative to the base in the first direction from the first alignment piece position to the second alignment piece position to pull the pull tab of the overlay applicator, and an adhesive release liner of the overlay applicator can be removed from an overlay of the overlay applicator to expose an adhesive agent of an overlay to a screen of the first electronic device.

Figure 26:
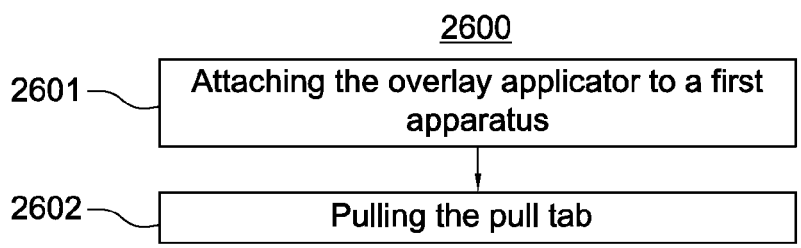
FIG. 26 illustrates a flow chart for a method of using an overlay applicator to apply an overlay to a screen of an electronic device, according to another embodiment.

Proceeding to the next drawing, FIG. 26 illustrates a flow chart for an embodiment of a method 2600 of using an overlay applicator to apply an overlay to a screen of an electronic device. Method 2600 is merely exemplary and is not limited to the embodiments presented herein. Method 2600 can be employed in many different embodiments or examples not specifically depicted or described herein. In some embodiments, the procedures, the processes, and/or the activities of method 2600 can be performed in the order presented. In other embodiments, the procedures, the processes, and/or the activities of the method 2600 can be performed in any other suitable order. In still other embodiments, one or more of the procedures, the processes, and/or the activities in method 2600 can be combined or skipped. In some embodiments, the overlay applicator can be similar or identical to overlay applicator 100 (FIG. 1), overlay applicator 400 (FIGS. 4-5), overlay applicator 600 (FIG. 6), overlay applicator 700 (FIG. 7), and/or overlay applicator 1500 (FIG. 15). In many embodiments, the overlay can be similar or identical to overlay 130 (FIG. 1), overlay 430 (FIGS. 4-5), overlay 630 (FIG. 6), overlay 730 (FIG. 7), and/or overlay 1530 (FIG. 15).

Referring to FIG. 26, method 2600 can include a block 2601 of attaching the overlay applicator to a first apparatus. In some embodiments, the first apparatus can be a frame. The frame can be similar or identical to frame 210 (FIG. 2).

In many embodiments, the first apparatus can be a cradle. The cradle can be similar or identical to cradle 310 (FIG. 3), cradle 832 (FIGS. 8-9, 12-14) and/or cradle 2032 (FIG. 20). In several embodiments, the first apparatus can be a machine. The machine can be similar or identical to machine 800 (FIGS. 8-14), machine 1600 (FIGS. 16-19), and/or machine 2000 (FIGS. 20-22). In many embodiments, the first apparatus can securely hold the electronic device.

In many embodiments, the overlay applicator can include an overlay. In many embodiments, the overlay can be similar or identical to overlay 130 (FIG. 1), overlay 430 (FIGS. 4-5), overlay 630 (FIG. 6), overlay 730 (FIG. 7), and/or overlay 1530 (FIG. 15). In a number of embodiments, the overlay can have a top side and a bottom side. The top side of the overlay can be similar or identical to top side 131 (FIG. 1) of overlay 130 (FIG. 1). The bottom side of the overlay can be similar or identical to bottom side 132 (FIG. 1) of overlay 130 (FIG. 1). In various embodiments, the bottom side can include an adhesive agent configured to adhere to the screen of the electronic device.

In a number of embodiments, the overlay applicator can include an adhesive release liner. The adhesive release liner can be similar or identical to adhesive release liner 140 (FIG. 1), adhesive release liner 440 (FIGS. 4-5), adhesive release liner 640 (FIG. 6), adhesive release liner 740 (FIG. 7); and/or adhesive release liner 1540 (FIG. 15). In a number of embodiments, the adhesive release liner can have a top side and a bottom side. The top side of the adhesive release liner can be removably attached to the bottom side of the overlay. In some embodiments, the adhesive release liner can be configured to protect the adhesive agent at the bottom side of the overlay from contaminants.

In several embodiments, the overlay applicator can include a protective film. In some embodiments, the protective film can be similar or identical to protective film 120 (FIG. 1), protective film 420 (FIGS. 4-5), protective film 620 (FIG. 6), protective film 720 (FIG. 7), and/or protective film 1520 (FIG. 15). In many embodiments, the protective film can be removably attached to the top side of the overlay.

In various embodiments, the overlay applicator can include an alignment tab. In some embodiments, the alignment tab can be similar or identical to alignment tab 110 (FIG. 1), alignment tab 410 (FIGS. 4-5), alignment tab 610 (FIG. 6), alignment frame 710 (FIG. 7), and/or alignment flaps 1510 (FIG. 15). In many embodiments, the alignment tab can include an alignment mechanism. The alignment mechanism can be similar or identical to alignment mechanism 115 (FIG. 1), alignment mechanism 415 (FIG. 4), alignment mechanism 615 (FIG. 6), alignment mechanism 715 (FIG. 7), and/or alignment mechanism 1515 (FIG. 15). In various embodiments, the alignment mechanism of the alignment tab can be configured to engage with an alignment base, such as alignment base 212 (FIG. 2), alignment base 312 (FIG. 3), alignment base 835 (FIGS. 8-9, 13-14), alignment base 1632 (FIGS. 16-19), and/or alignment base 2035 (FIG. 20), of the first apparatus.

In several embodiments, the overlay applicator can include a pull tab. In some embodiments, the pull tab can be similar or identical to pull tab 150 (FIG. 1), pull tab 450 (FIGS. 4-5), pull tab 650 (FIG. 6), pull tab 750 (FIG. 7), and/or pull tab 1550 (FIG. 15). In many embodiments, the pull tab can include a wiper. The wiper can be similar or identical to wiper 157 (FIG. 1), wiper 457 (FIG. 4), wiper 657 (FIG. 6), and/or wiper 757 (FIG. 7).

In some embodiments, method 2600 can include a block 2602 of pulling the pull tab across the bottom side of the adhesive release liner to remove the adhesive release liner from the bottom side of the overlay to expose the adhesive agent to the screen of the electronic device.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that various elements of FIGS. 1-26 may be modified, combined, and/or interchanged, and that the foregoing discussion of certain of these embodiments does not necessarily represent a complete description of all possible embodiments. As another example, one or more of the procedures, processes, or activities of FIGS. 23-26 may include different procedures, processes, and/or activities and be performed in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. An overlay applicator, comprising:
an overlay layer, wherein the overlay layer includes an overlay layer top side and an overlay layer bottom side, wherein the overlay layer has a first length, and wherein the overlay layer has a perimeter corresponding to an outer boundary of the overlay layer;
an adhesive positioned on the overlay layer bottom side;
an adhesive release liner, wherein the adhesive release liner includes a release liner top side and a release liner bottom side, and wherein the release liner top side is removably attached to the overlay layer bottom side;
a pull tab layer attached to the adhesive release liner, the pull tab layer for removing the adhesive release liner from the overlay layer bottom side, wherein the pull tab layer has a pull tab top side and a pull tab bottom side, and wherein at least a portion of the pull tab layer is located outside the perimeter of the overlay layer;
a wiper positioned on the pull tab top side of the pull tab layer such that the wiper faces away from the overlay layer when the pull tab layer is extended across the adhesive release liner so that the pull tab bottom side faces the release liner bottom side; and
an alignment tab attached to the overlay layer, wherein the alignment tab includes an alignment mechanism positioned outside of the perimeter of the overlay layer, the alignment mechanism for removably engaging with an alignment base of an applicator machine or a cradle.

2. The overlay applicator of claim 1, wherein the alignment mechanism corresponds to one or more alignment slots or holes in the alignment tab.

3. The overlay applicator of claim 1, wherein the adhesive release liner and the pull tab layer are integral with each other.

4. The overlay applicator of claim 1, wherein the adhesive release liner extends outside of the perimeter of the overlay layer and includes a second alignment mechanism positioned outside of the perimeter of the overlay layer.

5. The overlay applicator of claim 1, wherein the wiper is positioned to overlap the perimeter of the overlay layer when the pull tab layer is extended across the adhesive release liner so that the pull tab bottom side faces the release liner bottom side.

6. The overlay applicator of claim 1, wherein the pull tab layer includes a pulling aid, and wherein the pulling aid corresponds to one or more slots or holes in the pull tab layer.

7. The overlay applicator of claim 1, wherein the pull tab layer and the adhesive release liner are attached at a proximal end of the pull tab layer and wherein the pull tab layer includes a pulling aid at a distal end of the pull tab layer.

8. The overlay applicator of claim 1, further comprising a protective layer removably attached to the overlay layer by a second layer of adhesive between a protective layer bottom side and the overlay layer top side.

9. The overlay applicator of claim 8, wherein the alignment tab is attached to the overlay layer via the protective layer.

10. The overlay applicator of claim 8, wherein the alignment tab is integral with the protective layer.

11. The overlay applicator of claim 8, further comprising a joining sticker attached to the alignment tab and to a protective layer top side of the protective layer.

12. The overlay applicator of claim 1, wherein the alignment tab is attached to the overlay layer at an interface slit.

13. A method, comprising:
attaching an alignment mechanism of an overlay applicator to an alignment base of an applicator machine or a cradle supporting an electronic device, wherein the overlay applicator includes:
an overlay layer, wherein the overlay layer includes an overlay layer top side and an overlay layer bottom side, wherein the overlay layer has a first length, and wherein the overlay layer has a perimeter corresponding to an outer boundary of the overlay layer;
an adhesive positioned on the overlay layer bottom side;
an adhesive release liner, wherein the adhesive release liner includes a release liner top side and a release liner bottom side, and wherein the release liner top side is removably attached to the overlay layer bottom side;
a pull tab layer attached to the adhesive release liner, the pull tab layer for removing the adhesive release liner from the overlay layer bottom side, wherein the pull tab layer has a pull tab top side and a pull tab bottom side, and wherein at least a portion of the pull tab layer is located outside the perimeter of the overlay layer;
a wiper positioned on the pull tab top side of the pull tab layer such that the wiper faces away from the overlay layer when the pull tab layer is extended across the adhesive release liner so that the pull tab bottom side faces the release liner bottom side; and
an alignment tab attached to the overlay layer, wherein the alignment tab includes the alignment mechanism positioned outside of the perimeter of the overlay layer, the alignment mechanism for removably engaging with the alignment base of the applicator machine or the cradle; and
pulling the pull tab layer to wipe the wiper across a screen of the electronic device, to remove the adhesive release liner from the overlay layer bottom side, and to adhere the overlay layer bottom side to the screen of the electronic device, wherein the alignment mechanism aligns the overlay layer with the screen of the electronic device as the overlay layer bottom side is adhered to the screen.

14. The method of claim 13, wherein alignment mechanism corresponds to one or more alignment slots or holes in the alignment tab.

15. The method of claim 13, wherein the adhesive release liner and the pull tab layer are integral with each other.

16. The method of claim 13, wherein the adhesive release liner extends outside of the perimeter of the overlay layer and includes a second alignment mechanism positioned outside of the perimeter of the overlay layer.

17. The method of claim 13, wherein the wiper is positioned to overlap the perimeter of the overlay layer when the pull tab layer is extended across the adhesive release liner so that the pull tab bottom side faces the release liner bottom side.

18. The method of claim 13, wherein the pull tab layer includes a pulling aid, and wherein the pulling aid corresponds to one or more slots or holes in the pull tab layer.

19. The method of claim 13, wherein the pull tab layer and the adhesive release liner are attached at a proximal end of the pull tab layer and wherein the pull tab layer includes a pulling aid at a distal end of the pull tab layer.

20. The method of claim 13, wherein the overlay applicator further includes a protective layer removably attached to the overlay layer by a second layer of adhesive between a protective layer bottom side and the overlay layer top side.

21. The method of claim 20, wherein the alignment tab is attached to the overlay layer via the protective layer.

22. The method of claim 20, wherein the alignment tab is integral with the protective layer.

23. The method of claim 20, wherein the overlay applicator further includes a joining sticker attached to the alignment tab and to a protective layer top side of the protective layer.

24. The method of claim 13, wherein the alignment tab is attached to the overlay layer at an interface slit.

* * * * *